(12) United States Patent
Kim et al.

(10) Patent No.: US 9,646,523 B2
(45) Date of Patent: May 9, 2017

(54) DISPLAY DEVICE HAVING PIXEL ELECTRODE AND COMMON ELECTRODE ON ONE DISPLAY PANEL AND MANUFACTURING METHOD THEREOF

(71) Applicant: Samsung Display Co., Ltd., Yongin, Gyeonggi-Do (KR)

(72) Inventors: Duk-Sung Kim, Asan-si (KR); Jae Ho Choi, Asan-si (KR); Jae-Hyun Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 169 days.

(21) Appl. No.: 14/337,429

(22) Filed: Jul. 22, 2014

(65) Prior Publication Data

US 2015/0235585 A1  Aug. 20, 2015

(30) Foreign Application Priority Data

Feb. 18, 2014  (KR) ........................ 10-2014-0018653

(51) Int. Cl.
*G09G 3/18* (2006.01)
*G02F 1/1343* (2006.01)
*G02F 1/1362* (2006.01)

(52) U.S. Cl.
CPC ......... *G09G 3/18* (2013.01); *G02F 1/134363* (2013.01); *G02F 1/136227* (2013.01); *G02F 2001/134372* (2013.01); *G02F 2001/136231* (2013.01); *G09G 2300/0426* (2013.01); *G09G 2300/0434* (2013.01)

(58) Field of Classification Search
CPC ............. G09G 3/18; G09G 2300/0426; G09G 2300/0434; G02F 1/136227; G02F 1/134363; G02F 2001/136231; G02F 2001/134372
See application file for complete search history.

(56) References Cited

U.S. PATENT DOCUMENTS

| 7,960,732 | B2* | 6/2011 | Lee ...................... G02F 1/13458 257/59 |
| 8,268,654 | B2 | 9/2012 | Fujikawa et al. |
| 9,052,554 | B2* | 6/2015 | Ota ................... G02F 1/134363 |
| 9,230,998 | B2* | 1/2016 | Jang ....................... H01L 27/124 |
| 2007/0002251 | A1* | 1/2007 | Chang ............... G02F 1/134363 349/141 |

(Continued)

FOREIGN PATENT DOCUMENTS

| KR | 1020120007323 A | 1/2012 |
| KR | 1020140108967 A | 9/2014 |

*Primary Examiner* — Tracie Y Green
(74) *Attorney, Agent, or Firm* — Cantor Colburn LLP

(57) ABSTRACT

A display device includes a first signal electrode configured to transfer a signal, a first insulating layer positioned on the first signal electrode, a first electrode positioned on the first insulating layer, a second insulating layer positioned on the first electrode, and a second electrode positioned on the second insulating layer, where a first contact hole exposing the first signal electrode is defined in the first insulating layer and the second insulating layer, the second electrode is connected with the first signal electrode through the first contact hole, and an opening including an edge side surrounding the first contact hole in a plan view is defined in the first electrode.

20 Claims, 39 Drawing Sheets

(56) References Cited

U.S. PATENT DOCUMENTS

| | | |
|---|---|---|
| 2010/0001277 A1 | 1/2010 | Jeong et al. |
| 2010/0038642 A1* | 2/2010 | Choi ................ G02F 1/136227 |
| | | 257/59 |
| 2012/0068944 A1 | 3/2012 | Oh et al. |
| 2012/0280237 A1 | 11/2012 | Kwack et al. |
| 2012/0280957 A1 | 11/2012 | Yu et al. |
| 2013/0087794 A1 | 4/2013 | Kwack |
| 2014/0159070 A1* | 6/2014 | Hoka ................... H01L 27/124 |
| | | 257/88 |

* cited by examiner

DISPLAY DEVICE HAVING PIXEL ELECTRODE AND COMMON ELECTRODE ON ONE DISPLAY PANEL AND MANUFACTURING METHOD THEREOF

This application claims priority to Korean Patent Application No. 10-2014-0018653, filed on Feb. 18, 2014, and all the benefits accruing therefrom under 35 U.S.C. §119, the entire contents of which are incorporated herein by reference.

BACKGROUND (a) Field

The invention relates to a display device and a manufacturing method thereof, and more particularly, to a display device and a manufacturing method thereof capable of simplifying a manufacturing process.

(b) Description of the Related Art

A display device generally includes a display panel having pixels including switching elements and display signal lines, a gate driver transmitting gate signals to gate lines among the display signal lines to turn on/off the switching elements of the pixels, a data driver applying data voltages to data lines, a signal controller controlling the display panel, the gate driver, and the data driver, and the like.

Among various types of display devices, a liquid crystal display ("LCD") which is one of the most common types of flat panel displays currently in use, includes two sheets of display panels with field generating electrodes such as a pixel electrode and a common electrode, and a liquid crystal layer interposed therebetween. The LCD generates an electric field in the liquid crystal layer by applying a voltage to the field generating electrodes, and determines a direction of liquid crystal molecules of the liquid crystal layer by the generated electric field, thus controlling polarization of incident light so as to display images. Transmittance of the LCD may be increased as the liquid crystal molecules are well controlled.

At least one pixel electrode included in each pixel of the LCD is connected with the switching element connected to the display signal lines such as the gate line and the data line. The switching element, e.g., a three-terminal element such as a thin film transistor, transfers the data voltage to the pixel electrode.

In the LCD, the pixel electrode and the common electrode generating the electric field in the liquid crystal layer may be provided on one display panel with the switching element. At least one of the pixel electrode and the common electrode of the LCD may include a plurality of branch electrodes. When the electric field is generated in the liquid crystal layer, alignment directions of the liquid crystal molecules of the liquid crystal layer are determined by a fringe field generated by the branch electrodes.

SUMMARY

The invention has been made in an effort to provide a display device and a manufacturing method thereof having advantages of simplifying a manufacturing process by reducing the number of photomasks used when a display device in which a pixel electrode and a common electrode are included on one display panel is manufactured.

An exemplary embodiment of the invention provides a display device, including a first signal electrode configured to transfer a signal, a first insulating layer positioned on the first signal electrode, a first electrode positioned on the first insulating layer, a second insulating layer positioned on the first electrode, and a second electrode positioned on the second insulating layer, where a first contact hole exposing the first signal electrode may be defined in the first insulating layer and the second insulating layer, the second electrode is connected with the first signal electrode through the first contact hole, and an opening including an edge side surrounding the first contact hole may be defined in the first electrode.

In an exemplary embodiment, the display device may further include a second signal electrode positioned below the first insulating layer, a second contact hole exposing the second signal electrode may be defined in the first insulating layer, and a first open portion substantially aligned with the second contact hole may be defined in the first electrode.

In an exemplary embodiment, the display device may further include a first contact assistant connected with the second signal electrode through the second contact hole and contacting an upper surface of the first electrode around the first open portion.

In an exemplary embodiment, a second open portion may be defined in the second insulating layer and surround the first open portion in a plan view.

In an exemplary embodiment, an edge side of the second open portion may be substantially aligned with an edge side of the first contact assistant.

In an exemplary embodiment, the display device may further include a third signal electrode positioned below the first insulating layer and separated from the first signal electrode, in which the first contact hole may expose the third signal electrode, and the second electrode may contact the first signal electrode and the third signal electrode through the first contact hole.

In an exemplary embodiment, the display device may further include a semiconductor positioned below the first insulating layer and connected with the first signal electrode, where a third open portion corresponding to a channel region of the semiconductor may be defined in the first electrode.

In an exemplary embodiment, a fourth open portion substantially aligned with the third open portion may be defined in the second insulating layer.

In an exemplary embodiment, the display device may further include a third signal electrode positioned below the first insulating layer and separated from the first signal electrode, in which the first contact hole may expose the third signal electrode, and the second electrode may contact the first signal electrode and the third signal electrode through the first contact hole.

Another exemplary embodiment of the invention provides a manufacturing method of a display device, including disposing a first signal electrode on a substrate, disposing a first insulating layer, a first electrode, and a second insulating layer positioned on the first signal electrode in sequence, disposing a first photosensitive film pattern on the second insulating layer, defining a plurality of first open portions exposing the first electrode by etching the second insulating layer that is exposed by the first photosensitive film pattern, and defining a plurality of second open portions respectively corresponding to the plurality of first open portions by etching the exposed first electrode, where a width of a second open portion of the plurality of second open portions taken along a horizontal direction of a cross section is larger than that of a corresponding first open portion of the plurality of first open portions.

In an exemplary embodiment, the first photosensitive film pattern may include a first portion and a second portion having a smaller thickness than the first portion, and the manufacturing method may further include providing a second photosensitive film pattern by removing the second portion of the first photosensitive film pattern, after the defining the second open portion.

In an exemplary embodiment, the manufacturing method may further include exposing the first signal electrode and a part of the first electrode by etching the second insulating layer and the first insulating layer that are exposed by the second photosensitive film pattern after the providing the second photosensitive film pattern.

In an exemplary embodiment, the manufacturing method may further include, after the exposing the first signal electrode and the part of the first electrode by etching the second insulating layer and the first insulating layer that are exposed by the second photosensitive film pattern, disposing a second electrode layer on the second insulating layer, and providing a second electrode by patterning the second electrode layer.

In an exemplary embodiment, the manufacturing method may further include disposing a second signal electrode positioned below the first insulating layer, in which in the etching of the second insulating layer and the first insulating layer that are exposed by the second photosensitive film pattern, a second contact hole exposing the second signal electrode and substantially aligned with a corresponding second open portion of the plurality of second open portions may be defined in the first insulating layer.

In an exemplary embodiment, in the providing the second electrode, a first contact assistant connected with the second signal electrode through the second contact hole and contacting an upper surface of the first electrode around the second contact hole may be provided.

In an exemplary embodiment, the manufacturing method may further include providing a semiconductor positioned below the first insulating layer and connected with the first signal electrode, in which in the patterning of the second electrode layer, a part of the exposed first electrode may be removed together with the second electrode layer to define a third open portion corresponding to the channel region of the semiconductor.

In an exemplary embodiment, in the defining the plurality of first open portions, the first insulating layer may be etched together to expose the first signal electrode.

In an exemplary embodiment, in the defining the plurality of first open portions, a side surface of the first electrode may be exposed.

According to the exemplary embodiment of the invention, it is possible to simplify a manufacturing process by reducing the number of photomasks used when a display device in which a pixel electrode and a common electrode are included on one display panel is manufactured.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIGS. 3A to 14A are cross-sectional views sequentially illustrating an exemplary embodiment of intermediate manufacturing structures taken along line A-A' of FIG. 1 in an intermediate process of a manufacturing method of a display device according to the invention.

FIGS. 3B to 14B are cross-sectional views sequentially illustrating an exemplary embodiment of intermediate manufacturing structures taken along line B-B' and B"-B"' of FIG. 1 in an intermediate process of a manufacturing method of a display device according to the invention.

FIGS. 15A to 20A are cross-sectional views sequentially illustrating an exemplary embodiment of intermediate manufacturing structures taken along line A-A' of FIG. 1 in an intermediate process of a manufacturing method of a display device according to the invention.

FIGS. 15B to 20B are cross-sectional views sequentially illustrating an exemplary embodiment of intermediate manufacturing structures taken along line B-B' and B"-B"' of FIG. 1 in an intermediate process of a manufacturing method of a display device according to the invention.

DETAILED DESCRIPTION

Figure 1:
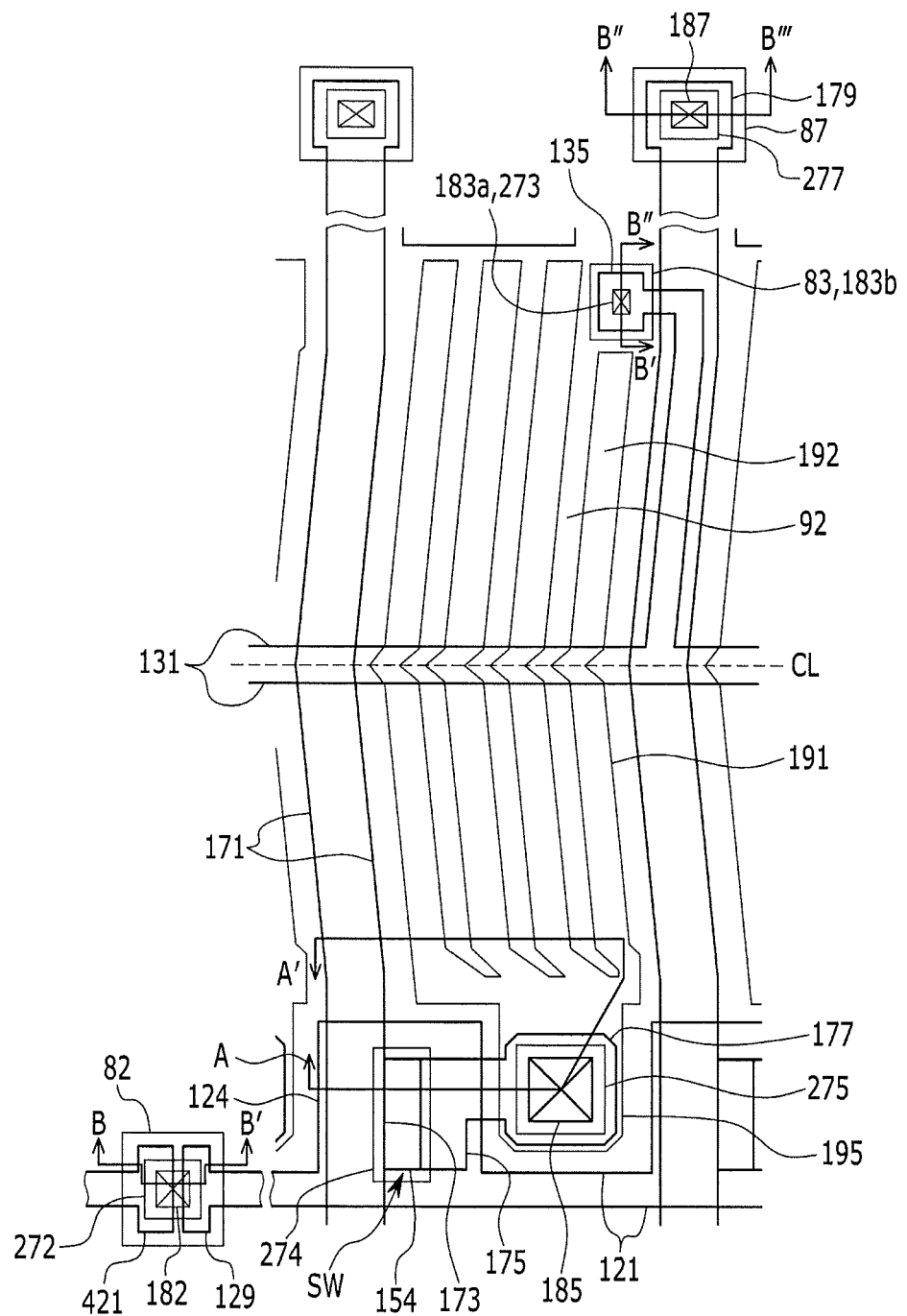
FIG. 1 is a plan view of an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device and a manufacturing method thereof according to an exemplary embodiment of the invention will be described in detail with reference to the accompanying drawings.

First, a display device according to an exemplary embodiment of the invention will be described with reference to FIGS. 1, 2A, and 2B.

Figure 2A:
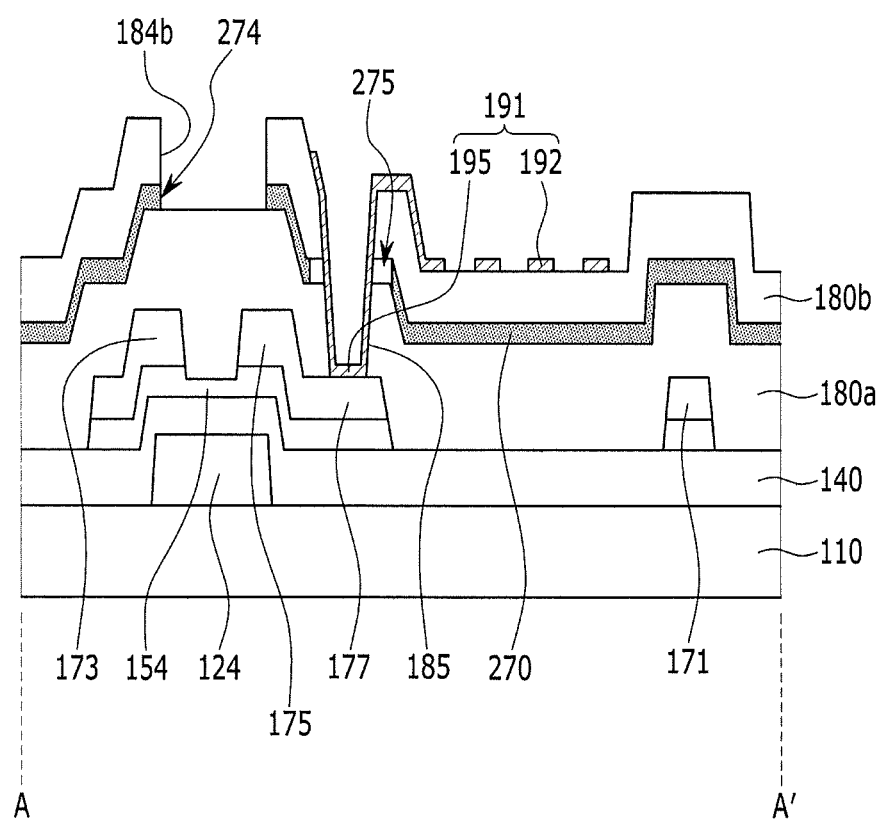
FIG. 2A is a cross-sectional view illustrating the display device of FIG. 1 taken along line A-A'.
Figure 2B:
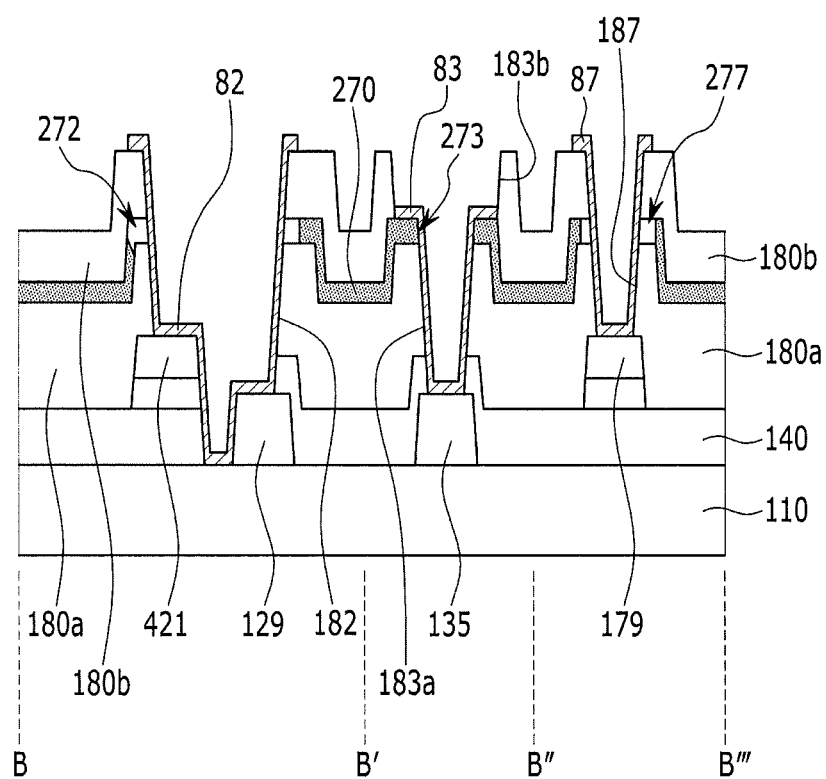
FIG. 2B is a cross-sectional view of the display device of FIG. 1 taken along line B-B' and B"-B"'.

FIG. 1 is a plan view of a display device according to an exemplary embodiment of the invention, FIG. 2A is a cross-sectional view illustrating the display device of FIG. 1 taken along line A-A', and FIG. 2B is a cross-sectional view of the display device of FIG. 1 taken along line B-B' and B''-B'''.

First, referring to FIGS. 1, 2A, and 2B, a display device according to an exemplary embodiment of the invention includes a lower panel (not illustrated) and an upper panel (not illustrated) facing each other, and a liquid crystal layer (not illustrated) interposed therebetween.

Although not illustrated, the upper panel may include an insulation substrate (not illustrated) including transparent glass, plastic, or the like.

In an exemplary embodiment, the liquid crystal layer includes liquid crystal molecules having dielectric anisotropy, for example. In an exemplary embodiment, the liquid crystal molecules may be aligned so that long axes thereof are parallel or vertical to the display panel while an electric field is not applied to liquid crystal layer. In an exemplary embodiment, the liquid crystal molecules may be nematic liquid crystal molecules having a structure in which long-axial directions thereof are spirally twisted from the lower panel to the upper panel, for example.

When describing the lower panel, gate conductors including a plurality of gate lines 121 and common voltage lines 131 are positioned on the insulation substrate 110 including transparent glass, plastic, or the like.

The gate lines 121 may transfer gate signals and extend in a substantially horizontal direction in a plan view. The gate line 121 includes a gate electrode 124 and an end portion 129 for connection with another layer or a gate driving circuit. In an exemplary embodiment, the gate electrode 124 may protrude upward from a portion of the gate lines 121 extending in a horizontal direction.

The common voltage line 131 transfers a predetermined voltage such as a common voltage and may extend in a substantially horizontal direction. The common voltage line 131 may be positioned between adjacent gate lines 121. The common voltage line 131 may include a connection bridge 135 protruding upward or downward from the portion of the common voltage line 131 extending in the horizontal direction. An end portion of the connection bridge 135 may be extended for connection with other layers. In another exemplary embodiment, the common voltage line 131 may be omitted when necessary.

In an exemplary embodiment, the gate conductor may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti).

In an exemplary embodiment, a gate insulating layer 140 including silicon nitride (SiNx), silicon oxide (SiOx), or the like is positioned on the gate conductor.

A semiconductor 154 is positioned on the gate insulating layer 140. In an exemplary embodiment, the semiconductor 154 may include amorphous silicon, polysilicon, or an oxide semiconductor, for example.

In an exemplary embodiment, ohmic contacts (not illustrated) may be further positioned on the semiconductor 154. In this case, the ohmic contacts may include a material such as n+ hydrogenated amorphous silicon in which an n-type impurity such as phosphorus is doped at a high concentration, or including silicide. In the case where the semiconductor 154 includes the oxide semiconductor, the ohmic contacts may be omitted.

A data conductor including a data line 171, a drain electrode 175, and an output electrode 421 is positioned on the semiconductor 154.

The data line 171 transfers a data signal and extends in a substantially vertical direction to cross the gate line 121 and the common voltage line 131.

The data line 171 may be periodically curved. In an exemplary embodiment, as illustrated in FIG. 1, each data line 171 may be curved at least one time at a portion corresponding to a horizontal center line CL of one pixel PX.

The connection bridge 135 of the common voltage line 131 described above may include an extending portion overlapping with the data line 171.

Each data line 171 includes a source electrode 173, and an end portion 179 for connection with another layer or a data driving circuit. The source electrode 173 may overlap with the gate electrode 124. According to the exemplary embodiment illustrated in FIG. 1, the source electrode 173 may be positioned on the same line as the data line 171 without protruding from the data line 171.

The drain electrode 175 faces the source electrode 173 based on the gate electrode 124. In an exemplary embodiment, the drain electrode 175 may include a rod-shaped portion extending substantially in parallel with the source electrode 173, and an extension 177 which is opposite to the rod-shaped portion.

The output electrode 421 includes an end portion adjacent to the end portion 129 of the gate line 121. The output electrode 421 is connected with a gate driving circuit to transfer a gate signal.

In an exemplary embodiment, the data conductor may include a refractory metal such as molybdenum, chromium, tantalum, and titanium or an alloy thereof, and may have a multilayered structure including a refractory metal layer (not illustrated) and a low resistive conductive layer (not illustrated).

The gate electrode 124, the source electrode 173, and the drain electrode 175 provide one thin film transistor ("TFT") SW together with the semiconductor 154. A channel of the TFT SW is provided in the semiconductor 154 between the source electrode 173 and the drain electrode 175. A planar shape of the semiconductor 154 except for the channel region may be substantially the same as a planar shape of the data conductor.

A first insulating layer 180a is positioned on the data conductor. In an exemplary embodiment, the first insulating layer 180a may include an organic insulating material or an inorganic insulating material. Contact holes 183a exposing the end portion of the connection bridge 135 are defined in the first insulating layer 180a and the gate insulating layer 140.

A common electrode 270 is positioned on the first insulating layer 180a.

In an exemplary embodiment, the common electrode 270 may have a substantially planar shape, and the common electrodes 270 may be sequentially provided throughout the plurality of pixels PX.

An opening 274 positioned to correspond to an upper portion of the channel region of the TFT SW exposing the first insulating layer 180a, an opening 275 corresponding to the extension 177 of the drain electrode 175, an opening 272 corresponding to the end portion 129 of the gate line 121, an opening 273 exposing the end portion of the connection bridge 135 together with the contact hole 183a, and an opening 277 corresponding to the end portion 179 of the data line 171 are defined in the common electrode 270.

Since the common electrode 270 is removed in the opening 274, an effect of the common voltage for the TFT SW therebelow may be removed. Since the common electrode 270 and the channel of the TFT SW do not overlap with each other in the opening 274, a leakage current of the TFT SW may be reduced, and even though a ripple occurs in the common voltage transferred by the common electrode 270, performance of the TFT SW may not deteriorate.

An edge side of the opening 273 may be substantially aligned with an edge side of the contact hole 183a. That is, the opening 273 may be substantially aligned with the contact hole 183a.

A second insulating layer 180b is positioned on the common electrode 270. In an exemplary embodiment, the second insulating layer 180b may include an organic insulating material or an inorganic insulating material.

An opening 183b exposing the common electrode 270 and an opening 184b exposing the first insulating layer 180a exposed by the opening 274 of the common electrode 270 are defined in the second insulating layer 180b.

The contact hole 183a and the opening 273 of the common electrode 270 are positioned in the opening 183b, and the edge side of the opening 183b may surround the edge sides of the contact hole 183a and the opening 273 of the common electrode 270 in a plan view. The edge side of the opening 184b may be substantially aligned with the edge side of the opening 274 of the common electrode 270. That is, the opening 184b may be substantially aligned with the opening 274 of the common electrode 270.

A contact hole 185 exposing the extension 177 of the drain electrode 175 of the TFT SW and a contact hole 187 exposing the end portion 179 of the data line 171 are defined in the second insulating layer 180b and the first insulating layer 180a. The contact hole 185 is positioned in the opening 275 of the common electrode 270 and includes an edge side surrounded by the edge side of the opening 275 in a plan view. The contact hole 187 is positioned in the opening 277 of the common electrode 270 and includes an edge side surrounded by the edge side of the opening 277 in a plan view.

A contact hole 182 exposing the output electrode 421 and an end portion 129 of the gate line 121 may be defined in the second insulating layer 180b, the first insulating layer 180a, and the gate insulating layer 140. The contact hole 182 is positioned in the opening 272 of the common electrode 270 and includes an edge side surrounded by the edge side of the opening 272 in a plan view.

A plurality of pixel electrodes 191 and a plurality of contact assistants 82, 83, and 87 are positioned on the second insulating layer 180b.

The pixel electrode 191 may include a plurality of branch electrodes 192 overlapping with the common electrode 270, and a protrusion 195 for connection with other layers.

A slit 92 in which a portion of the pixel electrode 191 is removed is defined between the adjacent branch electrodes 192. The branch electrode 192 may extend in substantially parallel to the data line 171.

The protrusion 195 of the pixel electrode 191 is physically and electrically connected with the drain electrode 175 through the contact hole 185 to receive a voltage from the drain electrode 175. In this case, since the contact hole 185 is positioned in the opening 275 of the common electrode 270, the protrusion 195 of the pixel electrode 191 may not contact the common electrode 270 in the contact hole 185. That is, in the contact hole 185, the protrusion 195 of the pixel electrode 191 is spaced apart from the common electrode 270.

The contact assistant 82 is physically and electrically connected with the end portion 129 of the gate line 121 and the output electrode 421 through the contact hole 182 to electrically connect the end portion 129 of the gate line 121 and the output electrode 421. In this case, since the contact hole 182 is positioned in the opening 272 of the common electrode 270, the contact assistant 82 may not contact the common electrode 270 in the contact hole 182. That is, in the contact hole 182, the contact assistant 82 is spaced apart from the common electrode 270.

The contact assistant 83 is physically and electrically connected with the end portion of the connection bridge 135 through the contact hole 183a to receive the common voltage transferred by the common voltage line 131. The contact assistant 83 is further physically and electrically connected with the common electrode 270 around the opening 273 of the common electrode 270 which is exposed by the opening 183b of the second insulating layer 180b to transfer the common voltage to the common electrode 270. The contact assistant 83 may integrally contact the common electrode 270 exposed by the opening 183b. Particularly, the contact assistant 83 may integrally contact an upper surface of the common electrode 270 exposed by the opening 183b.

The edge side of the contact assistant 83 may be substantially aligned with the edge side of the opening 183b.

The contact assistant 87 may be electrically and physically connected with the end portion 179 of the data line 171 through the contact hole 187. In this case, since the contact hole 187 is positioned in the opening 277 of the common electrode 270, the contact assistant 87 may not contact the common electrode 270. That is, in the contact hole 187, the contact assistant 87 is spaced apart from the common electrode 270.

In an exemplary embodiment, the pixel electrode 191, the contact assistants 82, 83, and 87, and the common electrode 270 may include a transparent conductive material such as indium tin oxide ("ITO") or indium zinc oxide ("IZO") and a conductive material such as a metal.

The pixel electrode 191 receiving the data voltage and the common electrode 270 receiving the common voltage through the TFT SW generate an electric field in the liquid crystal layer together as two field generating electrodes to determine directions of the liquid crystal molecules and display an image. Particularly, the branch electrode 192 of the pixel electrode 191 generates a fringe field in the liquid crystal layer together with the common electrode 270 to determine alignment directions of the liquid crystal molecules.

The display device according to the exemplary embodiment of the invention may further include at least one polarizer, and the polarizer may operate in a normally black mode or a normally white mode according to a polarization axial direction of the polarizer.

Next, a manufacturing method of a display device according to an exemplary embodiment of the invention will be described with reference to FIGS. 3A to 14B in addition to FIGS. 1, 2A, and 2B described above.

FIGS. 3A, 4A, 5A, 6A, 7A, 8A, 9A, 10A, 11A, 12A, 13A and 14A are cross-sectional views sequentially illustrating intermediate manufacturing structures taken along line A-A' of FIG. 1 in an intermediate process of a manufacturing method of a display device according to an exemplary embodiment of the invention, and FIGS. 3B, 4B, 5B, 6B, 7B, 8B, 9B, 10B, 11B, 12B, 13B and 14B are cross-sectional views sequentially illustrating intermediate manufacturing structures taken along line B-B' and B"-B'" of FIG. 1 in an intermediate process of a manufacturing method of a display device according to an exemplary embodiment of the invention.

Figure 3A:
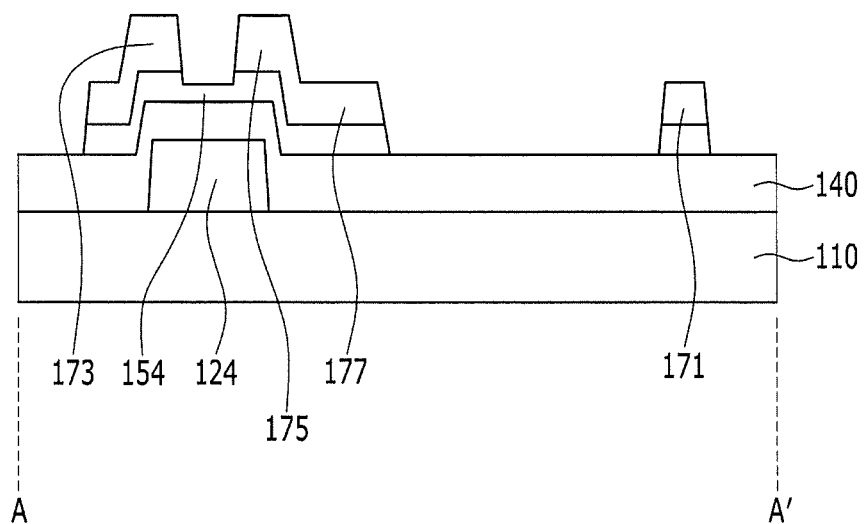
Figure 3B:
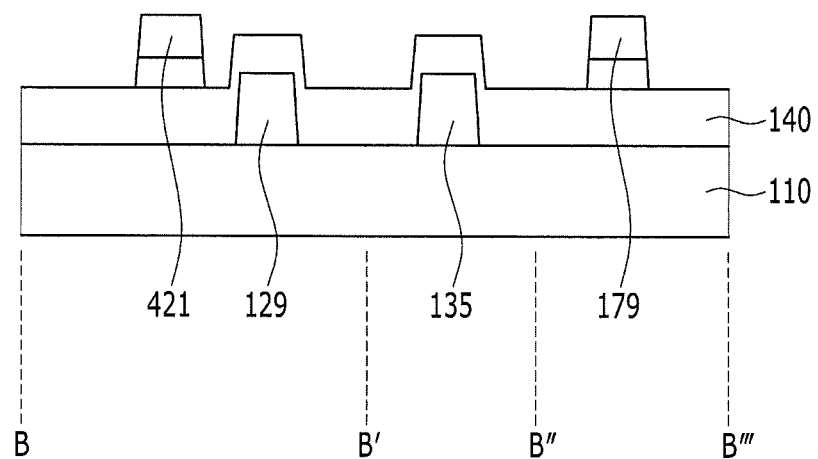

First, referring to FIGS. 3A and 3B, a gate conductor including a plurality of gate lines 121 including gate electrodes 124 and end portions 129 and a plurality of common voltage lines 131 including connection bridges 135 is provided by disposing and patterning a conductive material such as aluminum (Al) on the insulation substrate 110 including transparent glass, plastic, or the like.

In an exemplary embodiment, when the gate conductor is patterned, a photolithography process using one photomask may be used.

Next, a gate insulating layer 140 is provided by disposing an insulating material such as silicon nitride (SiNx) or silicon oxide (SiOx) on the gate conductor.

Next, a semiconductor layer (not illustrated) including amorphous silicon, polysilicon, metal oxide, or the like is disposed on the gate insulating layer 140, an ohmic contact layer (not illustrated) including a material such as n+ hydrogenated amorphous silicon in which impurity is doped at a high concentration or silicide is disposed thereon when necessary, and a data conductive layer including a conductive material such as a metal is disposed thereon. Next, a plurality of data conductors including a plurality of semiconductors 154, a plurality of data lines 171 including source electrodes 173 and end portions 179, a plurality of drain electrodes 175 including extensions 177, and a plurality of output electrodes 421 is provided by patterning the semiconductor layer and the data conductive layer.

In an exemplary embodiment, when the semiconductor 154 and the data conductor are patterned, a photolithography process using one photomask may be used.

According to another exemplary embodiment of the invention, the semiconductor 154 and the data conductor may be separately provided through photolithography processes using different photomasks. In an exemplary embodiment, a plurality of data conductors may be provided through a different photolithography process after providing the plurality of semiconductors 154 through one photolithography process.

As a result, the TFT SW including the gate electrode 124, the source electrode 173, the drain electrode 175, and the semiconductor 154 is provided.

Figure 4A:
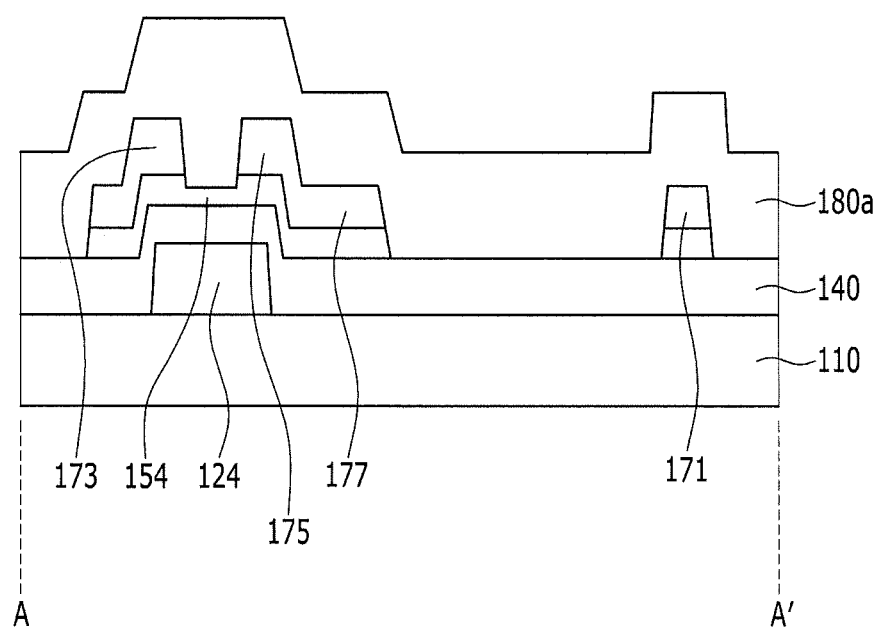
Figure 4B:
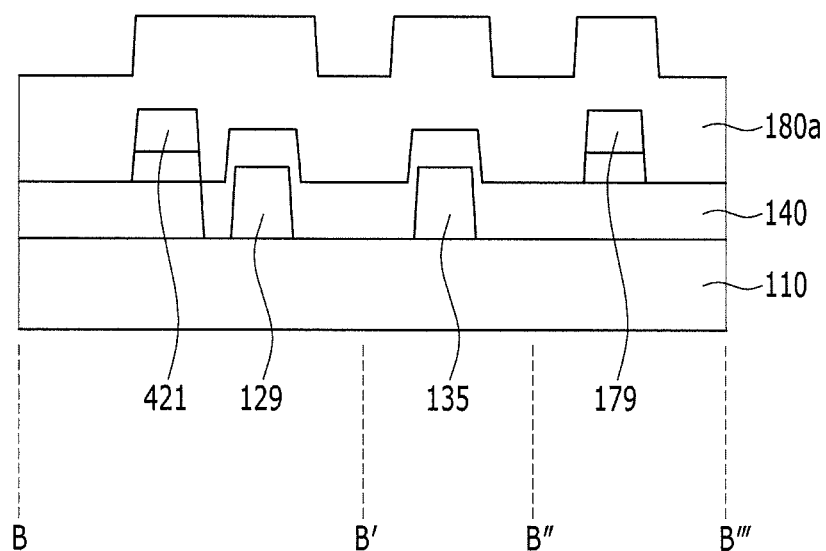

Next, referring to FIGS. 4A and 4B, the first insulating layer 180a is provided by disposing an inorganic insulating material or the like on the data conductor.

Figure 5A:
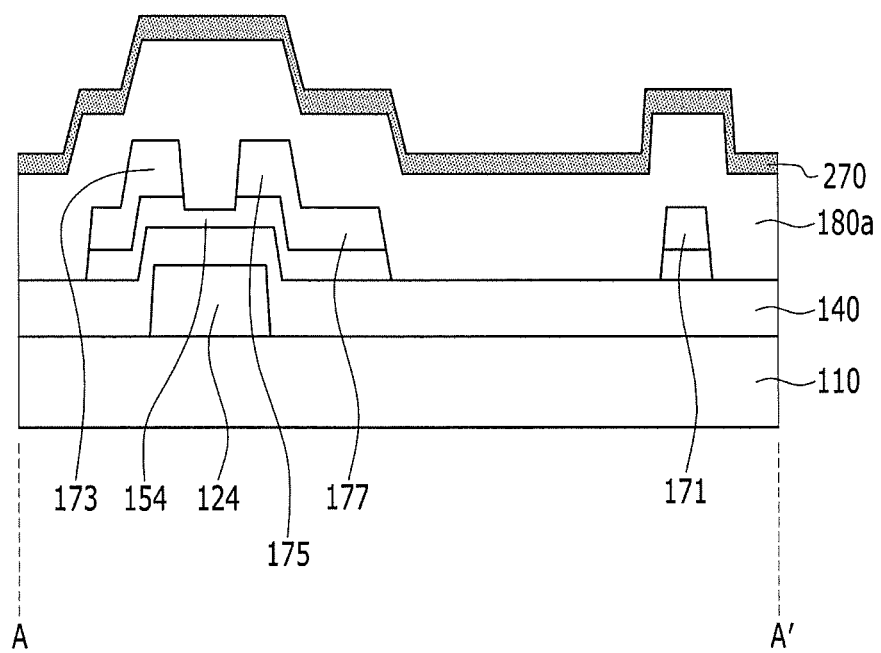
Figure 5B:
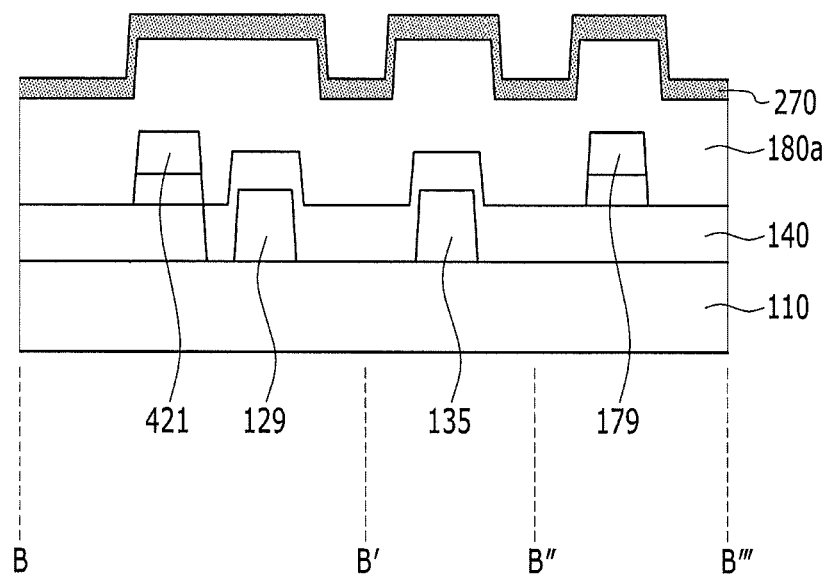

Next, referring to FIGS. 5A and 5B, the common electrode 270 is provided by disposing a transparent conductive material such as ITO or IZO and a conductive material such as a metal on the first insulating layer 180a.

Figure 6A:
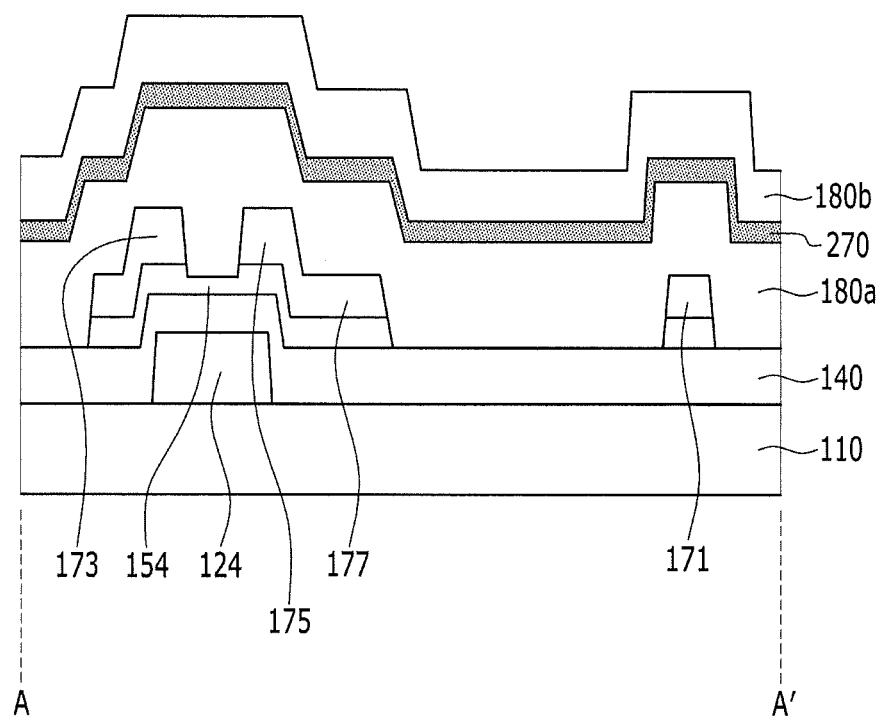
Figure 6B:
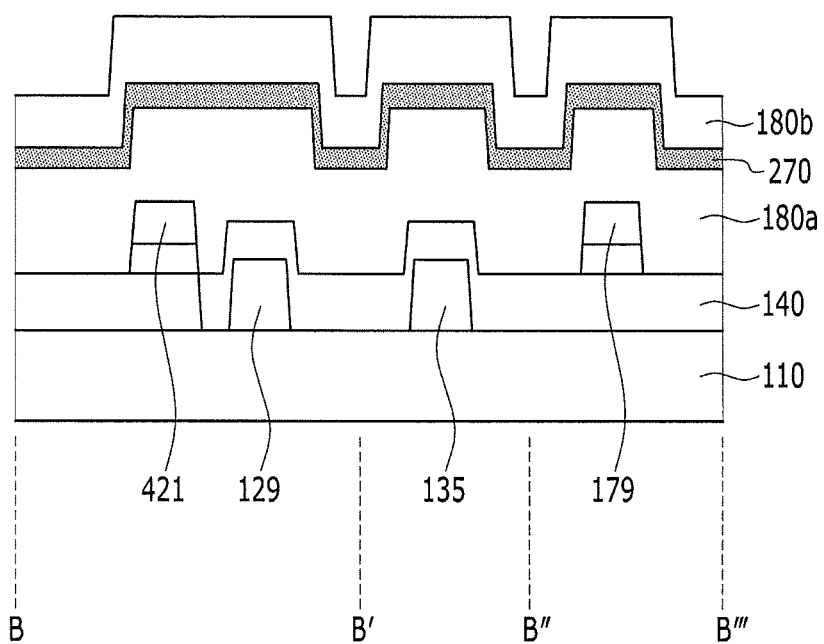

Next, referring to FIGS. 6A and 6B, the second insulating layer 180b is provided by disposing an insulating material on the common electrode 270.

That is, according to the exemplary embodiment of the invention, the first insulating layer 180a, the common electrode 270, and the second insulating layer 180b on the TFT SW are sequentially disposed without patterning.

Figure 7A:
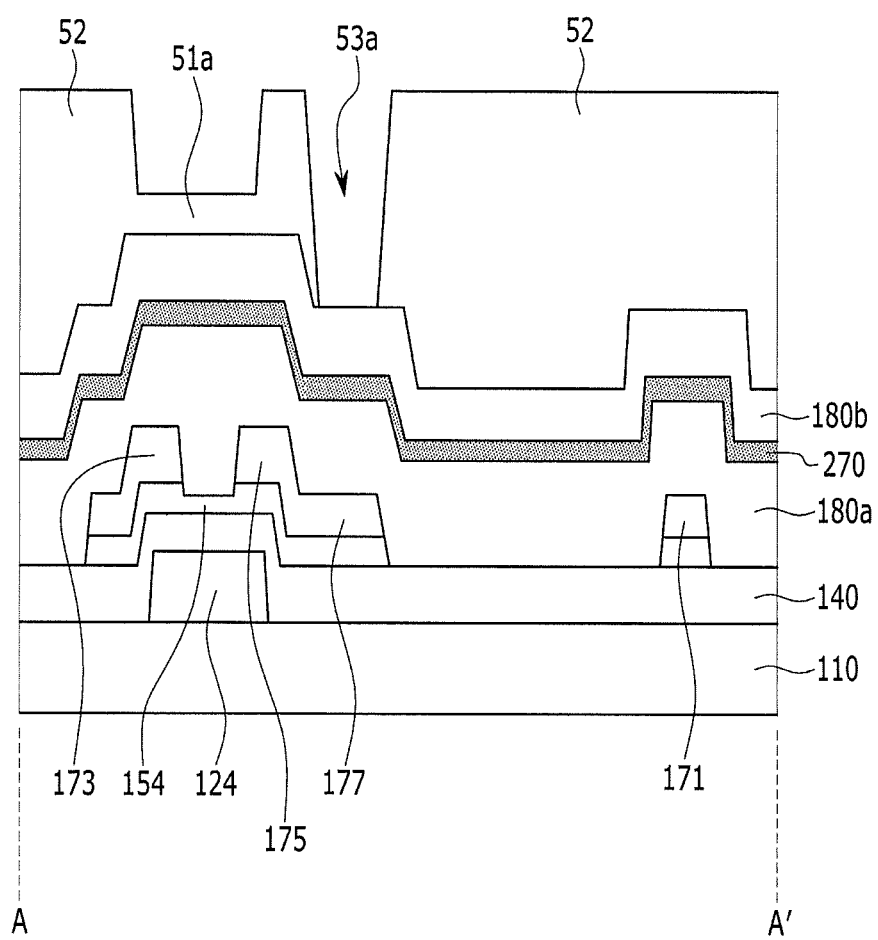
Figure 7B:
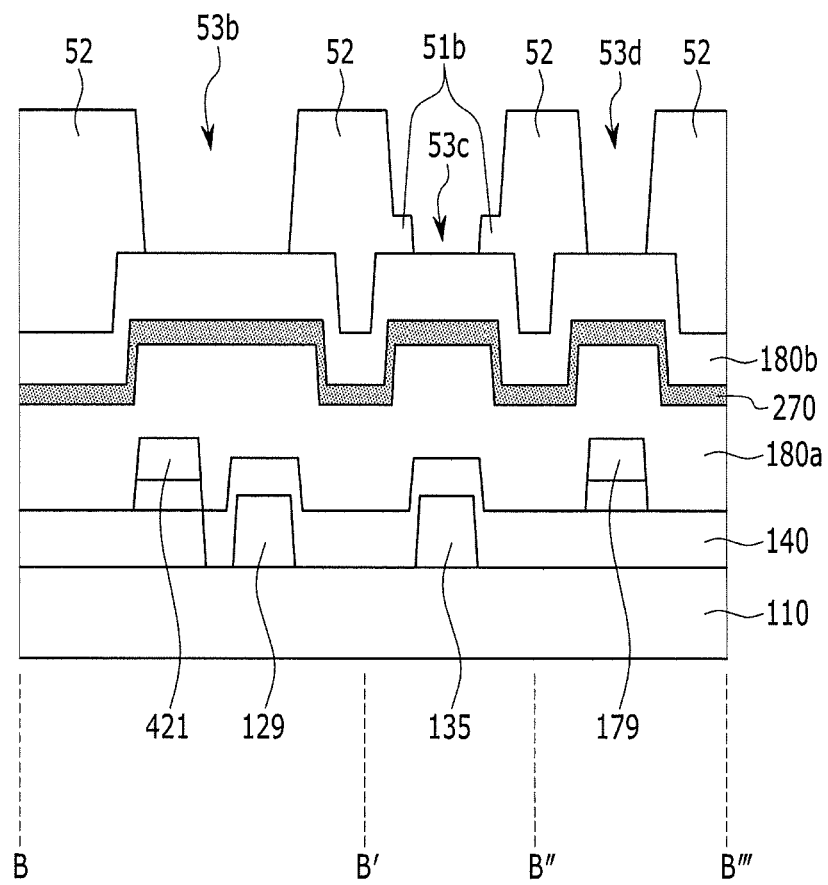

Next, referring to FIGS. 7A and 7B, a photosensitive film pattern including thin portions 51a and 51b, a thick portion 52, and defining openings 53a, 53b, 53c, and 53d therein is provided by disposing and exposing a photosensitive material such as a photoresist on the second insulating layer 180b.

Referring to FIG. 7A, the thin portion 51a of the photosensitive film pattern may be positioned at a place corresponding to a channel of the TFT SW. The opening 53a of the photosensitive film pattern may be positioned at a place corresponding to the extension 177 of the drain electrode 175 of the TFT SW.

Referring to FIG. 7B, the opening 53b of the photosensitive film pattern may be positioned at a place corresponding to the end portion 129 of the gate line 121 and the output electrode 421. The opening 53c of the photosensitive film pattern may be positioned at a place corresponding to the end portion of the connection bridge 135 of the common voltage line 131. The thin portion 51b of the photosensitive film pattern is positioned around the opening 53c. The opening 53d of the photosensitive film pattern may be positioned at a place corresponding to the end portion 179 of the data line 171.

In an exemplary embodiment, in the exposure process by which the photosensitive film pattern is provided, one photomask including a halftone area may be used, for example.

In an exemplary embodiment, in the case where a photosensitive material has negative photosensitivity in which a portion where light is not irradiated is removed, the light is irradiated to the thick portion 52 of the photosensitive film pattern through a transparent area of the photomask, the light is not irradiated to the openings 53a, 53b, 53c, and 53d of the photosensitive film pattern corresponding to an opaque area of the photomask, and the light is partially irradiated to the thin portions 51a and 51b of the photosensitive film pattern corresponding to the halftone area of the photomask, for example.

In the case where the photosensitive material has positive photosensitivity, in contrast with the case of having negative photosensitivity, transparency of the photomask is reversely changed, and thus the photosensitive film pattern may be provided.

In an exemplary embodiment, a slit or a latticed pattern may be defined in the halftone area of the photomask for controlling a light transmitting amount, or the halftone area of the photomask may be provided by using a halftone film.

Figure 8A:
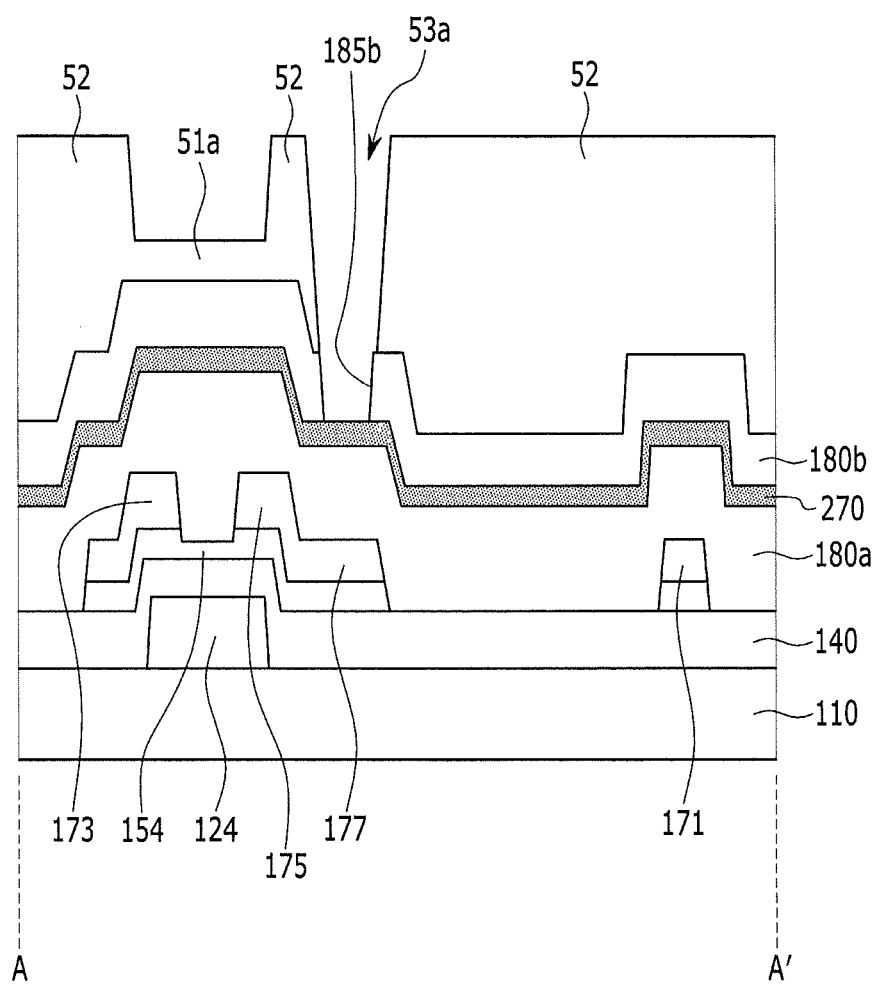
Figure 8B:
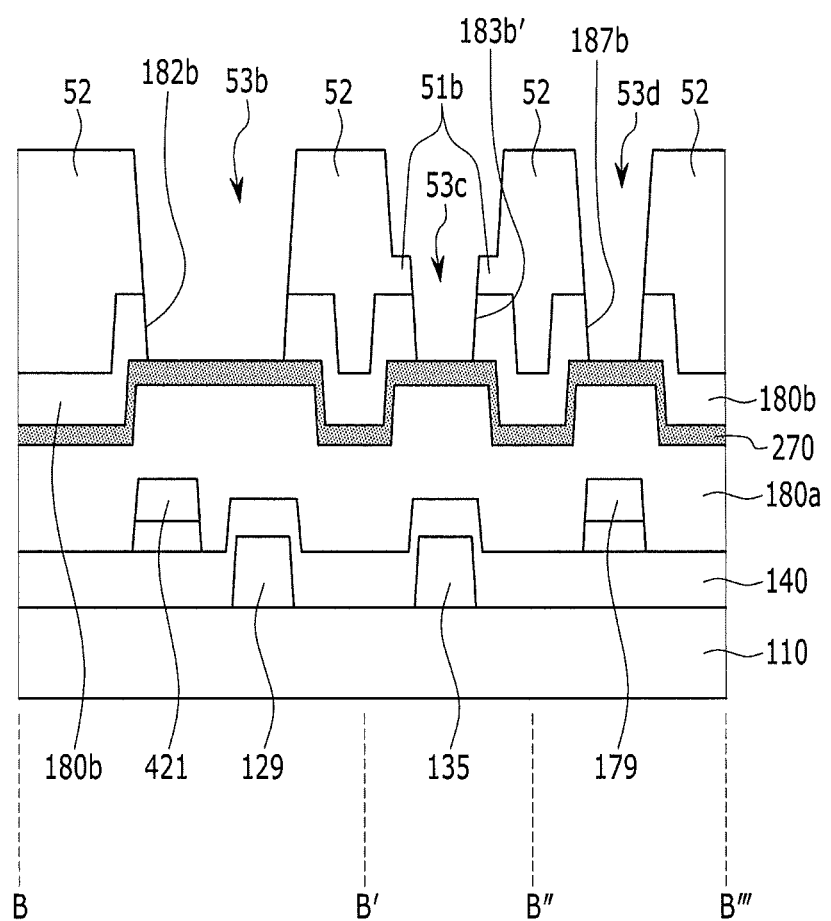

Next, referring to FIGS. 8A and 8B, the second insulating layer 180b exposed by the openings 53a, 53b, 53c, and 53d of the photosensitive film pattern is etched by using the photosensitive film pattern as an etching mask. In this case, a dry etch method may be used, for example.

As a result, an opening 185b corresponding to the extension 177 of the drain electrode 175, an opening 182b corresponding to the end portion 129 of the gate line 121 and the output electrode 421, an opening 183b' corresponding to the end portion of the connection bridge 135 of the common voltage line 131, and an opening 187b corresponding to the end portion 179 of the data line 171 are defined in the second insulating layer 180b.

Figure 9A:
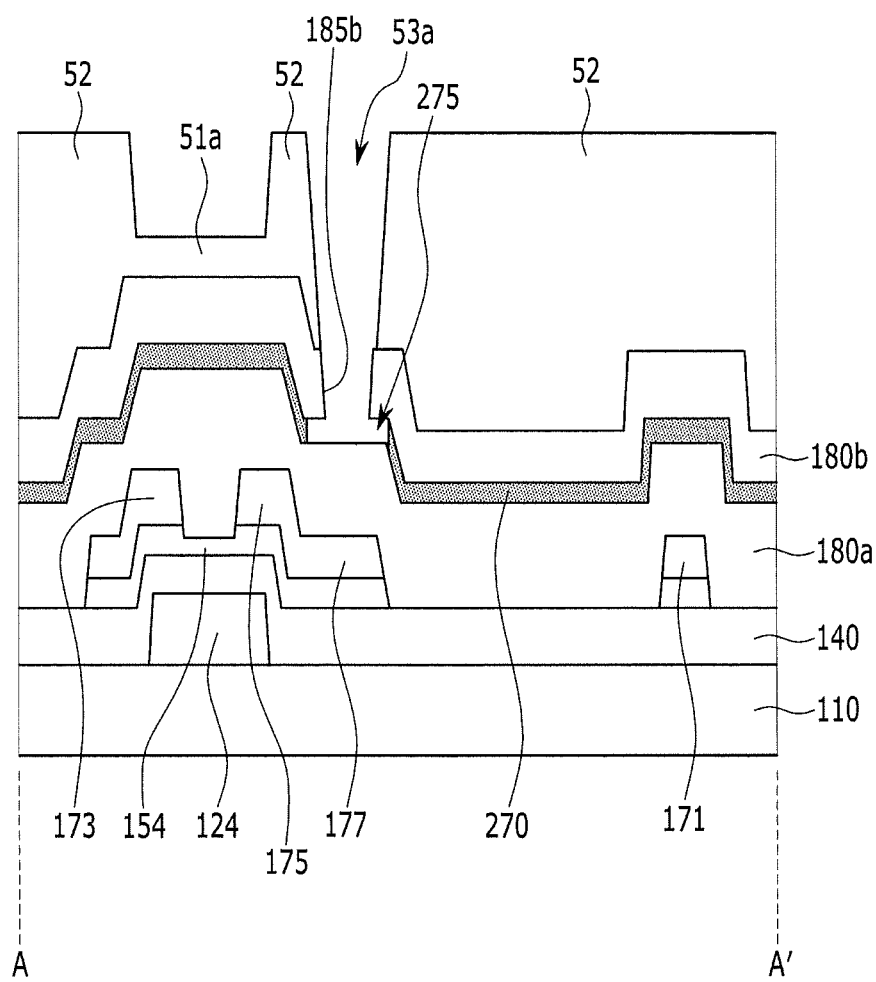
Figure 9B:
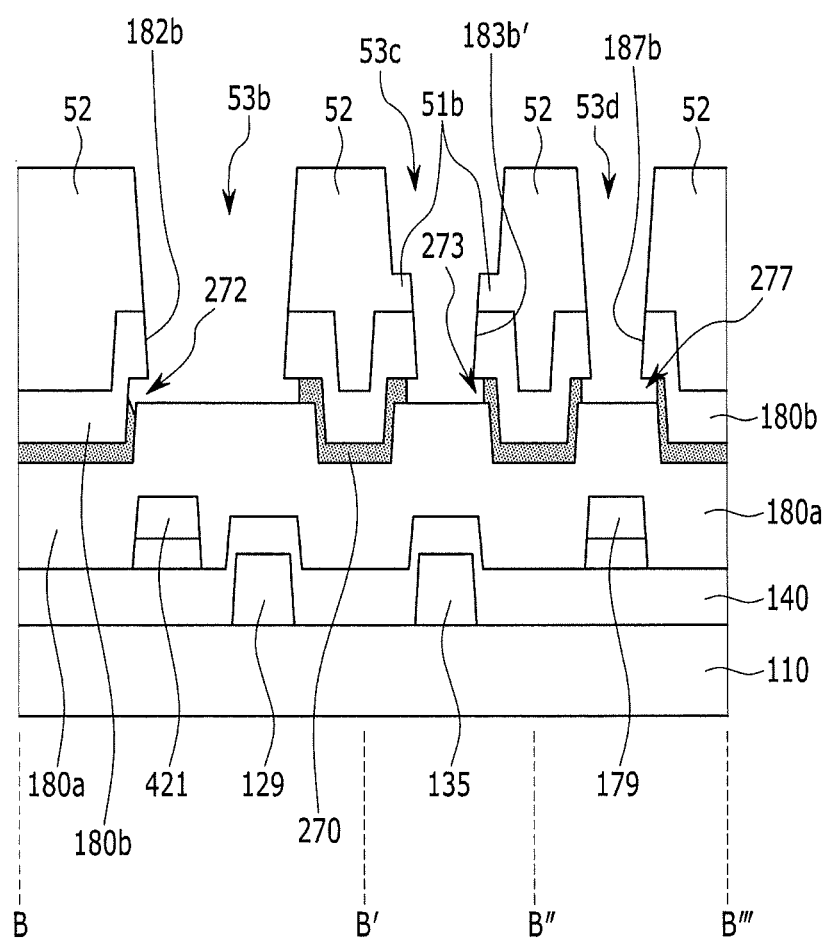

Next, referring to FIGS. 9A and 9B, an opening 275 corresponding to the extension 177 of the drain electrode 175, an opening 272 corresponding to the end portion 129 of the gate line 121 and the output electrode 421, an opening 273 corresponding to the end portion of the connection bridge 135 of the common voltage line 131, and an opening 277 corresponding to the end portion 179 of the data line 171 are defined by etching the common electrode 270 exposed by the openings 185b, 182b, 183b', and 187b of the second insulating layer 180b. In this case, a wet etch method may be used, for example.

Particularly, the common electrode 270 is over-etched so that widths of the openings 275, 272, 273, and 277 of the common electrode 270 taken along a horizontal direction in a cross section are greater than those of the openings 185b, 182b, 183b', and 187b of the second insulating layer 180b corresponding thereto, respectively. As a result, the edge sides of the openings 275, 272, 273, and 277 may be spaced apart from the edge sides of the openings 185b, 182b, 183b', and 187b of the second insulating layer 180b corresponding thereto, respectively.

In an exemplary embodiment, a distance where the edge sides of the openings 275, 272, 273, and 277 are spaced apart from the edge sides of the openings 185b, 182b, 183b', and 187b of the second insulating layer 180b respectively corresponding thereto, may be approximately about 1.0 micrometers (µm) or more, but is not limited thereto. However, the separation distance between the edge sides of the openings 275, 272, 273, and 277 and the edge sides of the openings 185b, 182b, 183b', and 187b of the second insulating layer 180b respectively corresponding thereto, may be sufficiently set so that the separation state may be maintained even after the etching process in a subsequent process, that is, the common electrode 270 may maintain an under-cut state with respect to the opening of the second insulating layer 180b.

Figure 10A:
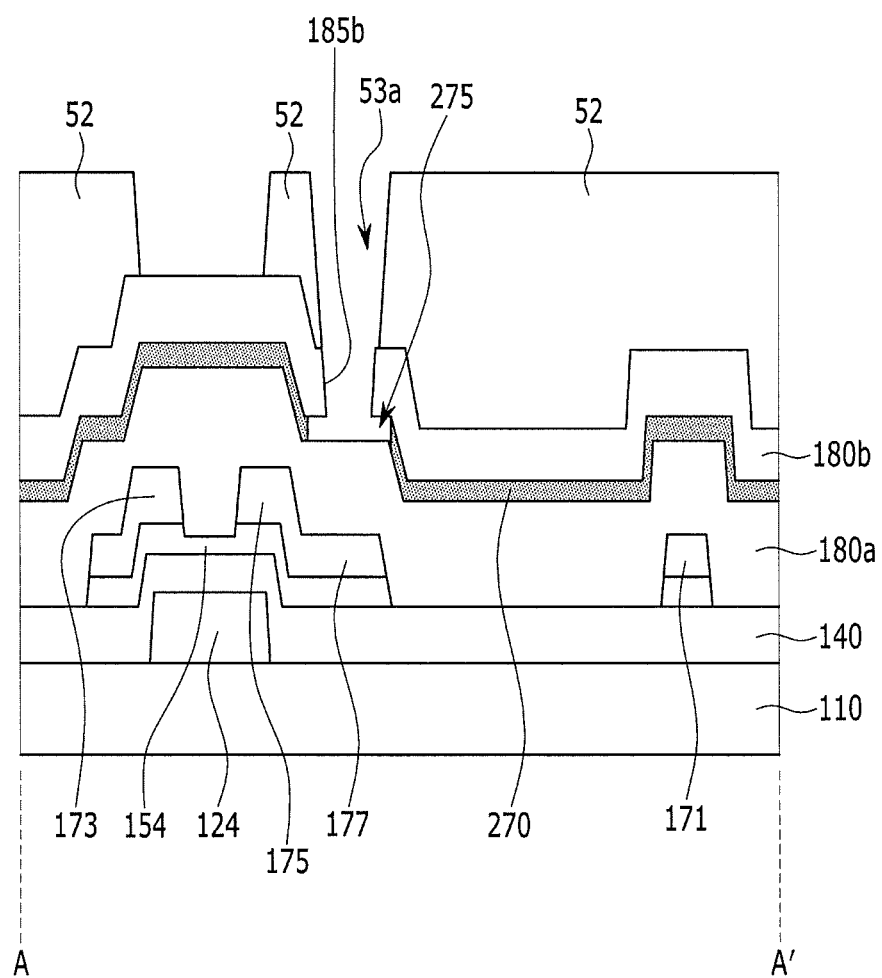
Figure 10B:
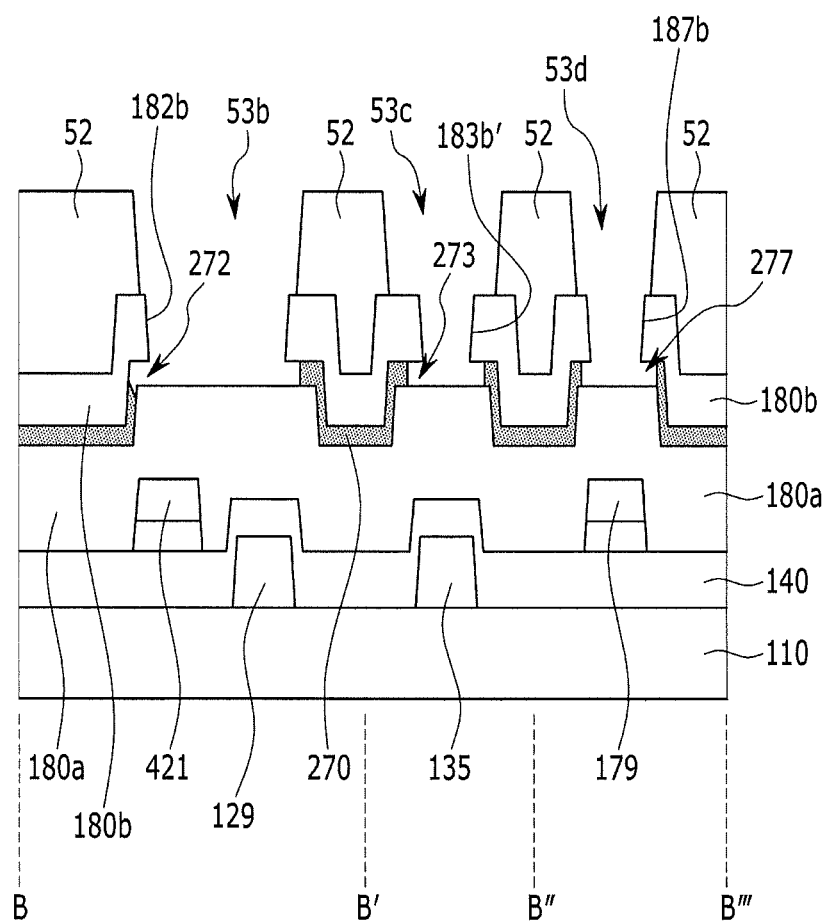

Next, referring to FIGS. 10A and 10B, the photosensitive film pattern is entirely etched by using a method such as ashing to remove the thin portions 51a and 51b. Then, the second insulating layer 180b corresponding to the channel region of the TFT SW is exposed, and the second insulating layer 180b around the opening 183b' of the second insulating layer 180b is exposed. In this case, the opening 53c of the photosensitive film pattern may expose at least a part of the common electrode 270 around the opening 273 (refer to FIG. 11B).

Figure 11A:
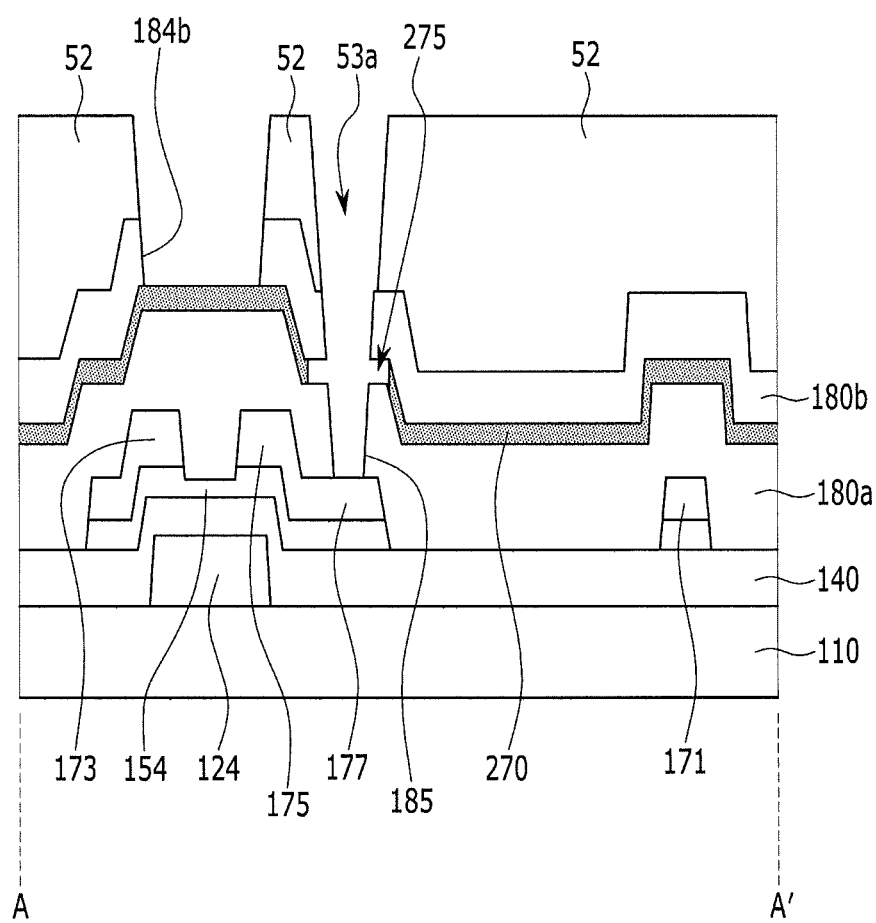
Figure 11B:
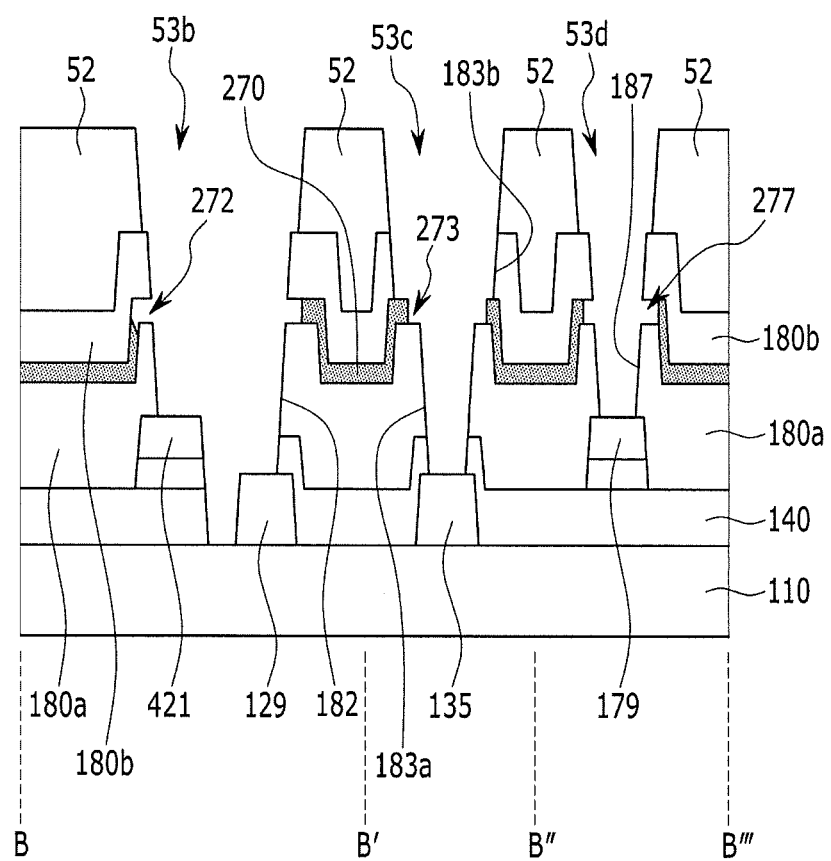

Next, referring to FIGS. 11A and 11B, the second insulating layer 180b, the first insulating layer 180a, and the gate insulating layer 140 which are exposed by using the photosensitive film pattern as the etching mask are etched by a method such as dry etching to define an opening 184b of the second insulating layer 180b corresponding to the channel region of the TFT SW, a contact hole 185 exposing the extension 177 of the drain electrode 175, a contact hole 182 exposing the end portion 129 of the gate line 121 and the output electrode 421, an opening 183b of the second insulating layer 180b exposing the common electrode 270 around the opening 273 of the common electrode 270, a contact hole 183a exposing the end portion of the connection bridge 135 of the common voltage line 131, and a contact hole 187 exposing the end portion 179 of the data line 171.

Figure 12A:
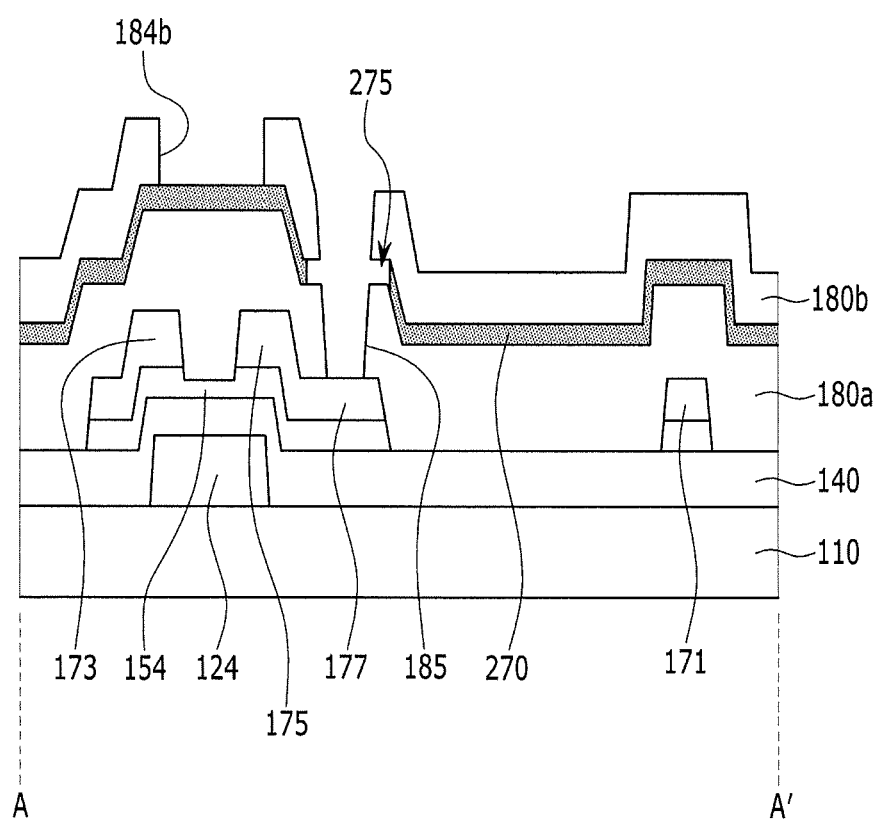
Figure 12B:
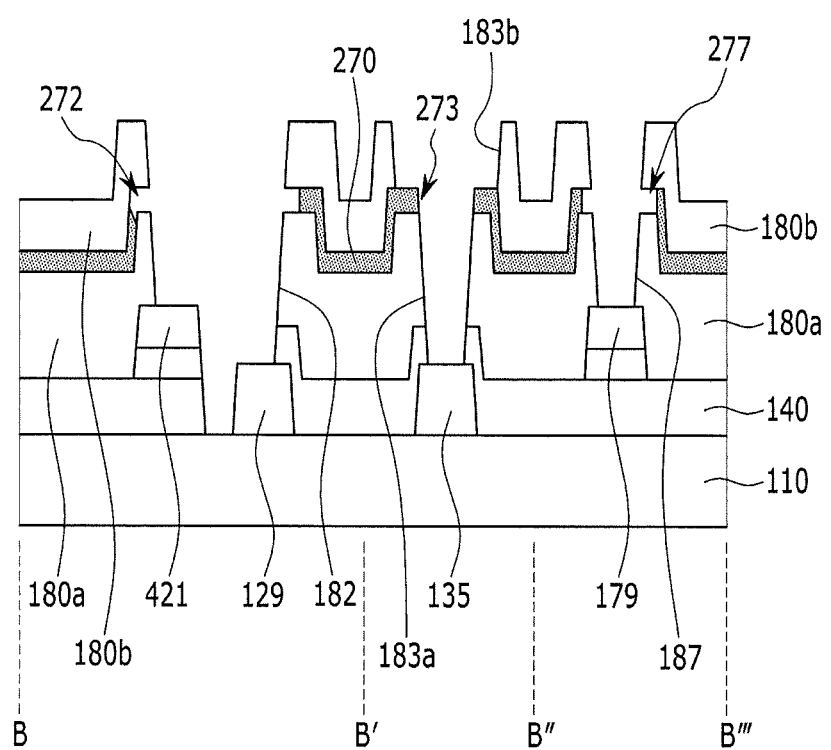

Next, referring to FIGS. 12A and 12B, the photosensitive film pattern is removed.

As such, the contact holes 185 and 187 defined in the first insulating layer 180a and the second insulating layer 180b, the contact holes 182 and 183a defined in the first insulating layer 180a and the gate insulating layer 140, the openings 183b and 184b defined in the second insulating layer 180b, and the openings 272, 273, 274, 275, and 277 defined in the common electrode 270 according to the exemplary embodiment of the invention may be defined by the photolithography process using one photomask including a halftone area, for example.

Figure 13A:
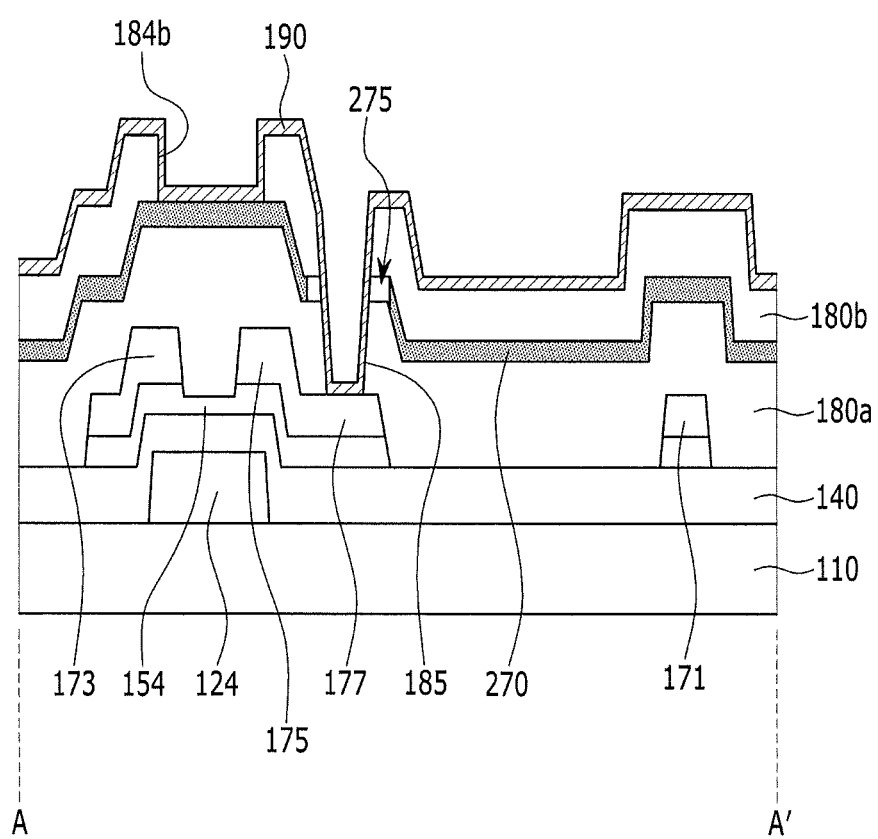
Figure 13B:
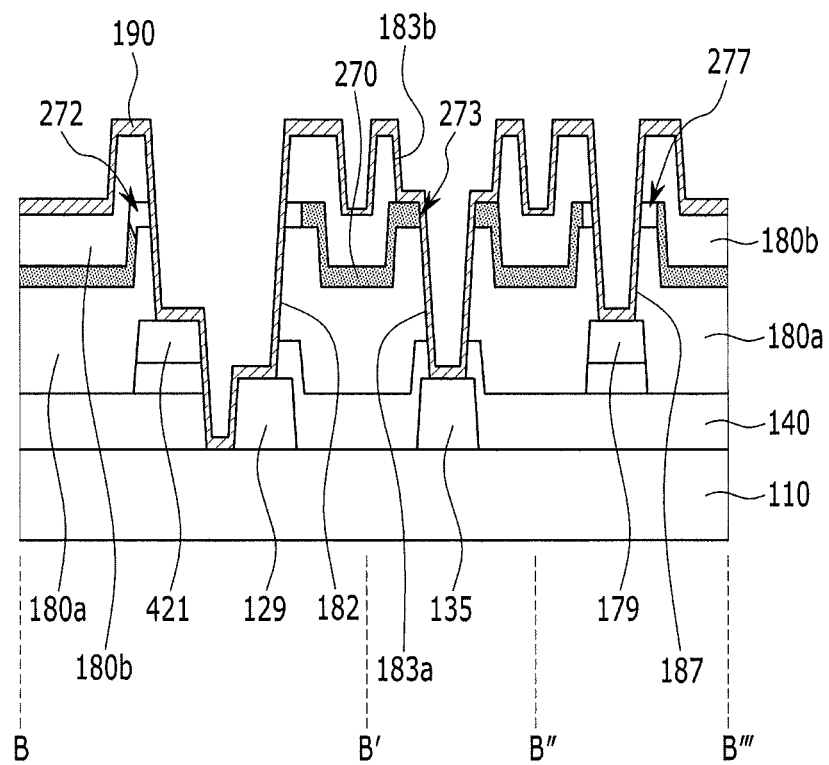

Next, referring to FIGS. 13A and 13B, a pixel electrode layer 190 is provided by disposing a transparent conductive material such as ITO or IZO and a conductive material such as a metal on the second insulating layer 180b. The pixel electrode layer 190 may contact the common electrode 270 in the opening 184b of the second insulating layer 180b, contact the extension 177 of the drain electrode 175 in the contact hole 185, contact the end portion 129 of the gate line 121 and the output electrode 421 in the contact hole 182, contact the connection bridge 135 of the common voltage line 131 in the contact hole 183a, and contact the end portion 179 of the data line 171 in the contact hole 187.

Figure 14A:
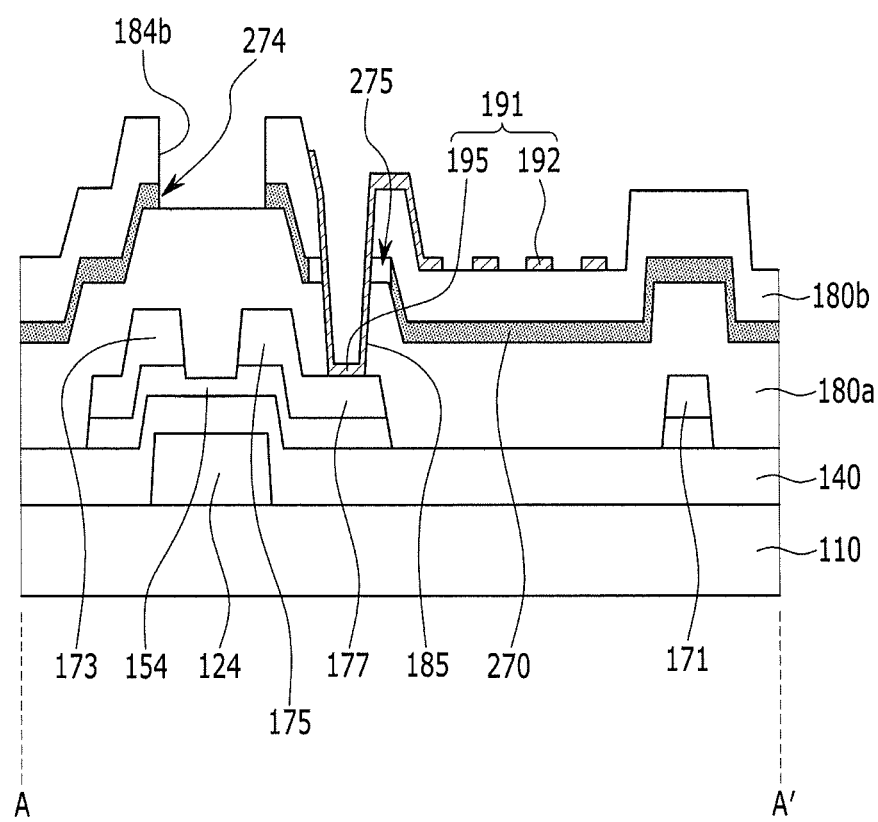
Figure 14B:
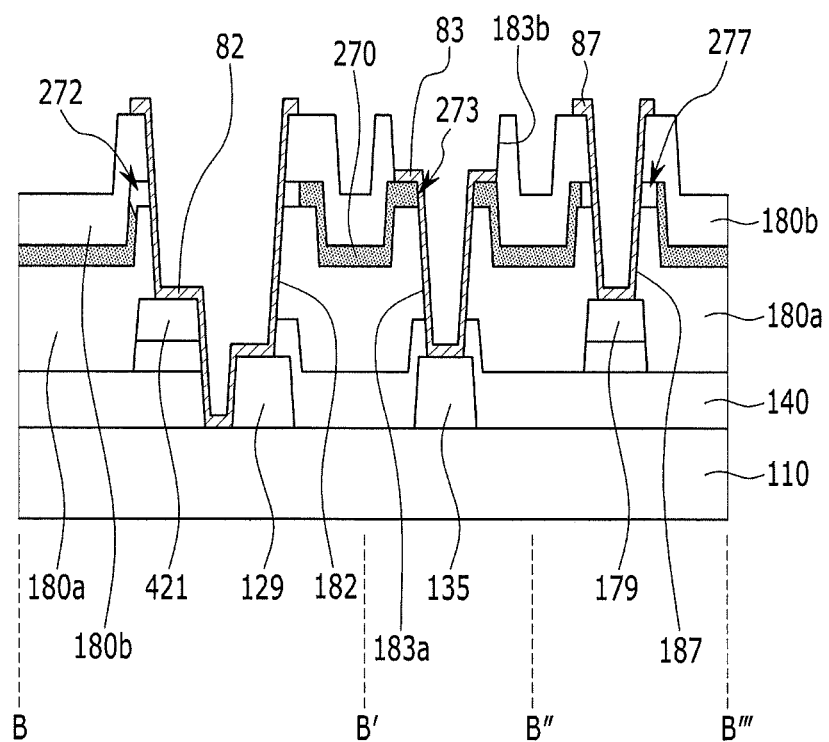

Next, referring to FIGS. 14A and 14B, a plurality of pixel electrodes 191 including a plurality of branch electrodes 192 and protrusions 195 and a plurality of contact assistants 82, 83, and 87 are provided by patterning the pixel electrode layer 190. In this case, a wet etch method may be used, for example. The portion of the common electrode 270 contacting the pixel electrode layer 190 in the opening 184b of the second insulating layer 180b is etched and removed together pixel electrode layer 190 during the patterning of the pixel electrode layer 190. In this case, the pixel electrode layer 190 and the common electrode 270 may be etched together by using the same etchant, for example. As a result, the opening 274 of the common electrode 270 positioned on the channel region of the TFT SW is defined.

In an exemplary embodiment, when the pixel electrode layer 190 is patterned, a photolithography process using one photomask may be used, for example.

As such, according to the manufacturing method of the display device according to the exemplary embodiment of the invention, the contact holes 185 and 187 defined in the first insulating layer 180a, the contact holes 182 and 183a defined in the first insulating layer 180a and the gate insulating layer 140, the openings 183b and 184b which are defined in the second insulating layer 180b, and the openings 272, 273, 274, 275, and 277 defined in the common electrode 270 may be defined by using one photomask, for example. Accordingly, the display device may be manufactured by using a minimum number of photomasks, and a manufacturing process may be simplified.

Next, a manufacturing method of a display device according to an exemplary embodiment of the invention will be described with reference to FIGS. 15A to 20B in addition to the drawings described above, particularly, FIGS. 1, 2A, and 7B. The same constituent elements as the exemplary embodiments described above are designated by the same reference numerals, and the duplicated description is omitted.

FIGS. 15A, 16A, 17A, 18A, 19A and 20A are cross-sectional views sequentially illustrating intermediate manufacturing structures taken along line A-A' of FIG. 1 in an intermediate process of a manufacturing method of a display device according to an exemplary embodiment of the invention, and FIGS. 15B, 16B, 17B, 18B, 19B and 20B are cross-sectional views sequentially illustrating intermediate manufacturing structures taken along line B-B' and B"-B'" of FIG. 1 in an intermediate process of a manufacturing method of a display device according to an exemplary embodiment of the invention.

First, as illustrated in FIGS. 3A and 3B described above, a gate conductor including a plurality of gate lines 121 including gate electrodes 124 and end portions 129 and a plurality of common voltage lines 131 including the connection bridges 135 is provided by disposing and patterning a conductive material such as aluminum (Al) on the insulation substrate 110 including transparent glass, plastic, or the like.

In an exemplary embodiment, when the gate conductor is patterned, a photolithography process using one photomask may be used, for example.

Next, a gate insulating layer 140 is provided by disposing an insulating material such as silicon nitride (SiNx) or silicon oxide (SiOx) on the gate conductor.

Next, a semiconductor layer (not illustrated) including amorphous silicon, polysilicon, metal oxide, or the like is disposed on the gate insulating layer 140, an ohmic contact layer (not illustrated) including a material such as n+ hydrogenated amorphous silicon in which impurity is doped at a high concentration or silicide is disposed thereon when necessary, and a data conductive layer including a conductive material such as a metal is disposed thereon. Next, a plurality of data conductors including a plurality of semiconductors 154, a plurality of data lines 171 including source electrodes 173 and end portions 179, a plurality of drain electrodes 175 including extensions 177, and a plurality of output electrodes 421 is provided by patterning the semiconductor layer and the data conductive layer.

In an exemplary embodiment, when the semiconductor 154 and the data conductor are patterned, a photolithography process using one photomask may be used, for example.

As a result, the TFT SW including the gate electrode 124, the source electrode 173, the drain electrode 175, and the semiconductor 154 is provided.

Next, as illustrated in FIGS. 4A to 6B described above, the first insulating layer 180a, the common electrode 270, and the second insulating layer 180b are sequentially disposed on the data conductor. The first insulating layer 180a, the common electrode 270, and the second insulating layer 180b may be sequentially disposed without patterning.

Next, as illustrated in FIGS. 7A and 7B described above, a photosensitive film pattern including thin portions 51a and 51b, a thick portion 52, and openings 53a, 53b, 53c, and 53d is defined by disposing and exposing a photosensitive material such as a photoresist on the second insulating layer 180b.

Referring to FIG. 7A, the thin portion 51a of the photosensitive film pattern may be positioned at a place corresponding to a channel of the TFT SW. The opening 53a of the photosensitive film pattern may be positioned at a place corresponding to the extension 177 of the drain electrode 175 of the TFT SW.

Referring to FIG. 7B, the opening 53b of the photosensitive film pattern may be positioned at a place corresponding to the end portion 129 of the gate line 121 and the output electrode 421. The opening 53c of the photosensitive film pattern may be positioned at a place corresponding to the end portion of the connection bridge 135 of the common voltage line 131. The thin portion 51b of the photosensitive film pattern is positioned around the opening 53c. The opening 53d of the photosensitive film pattern may be positioned at a place corresponding to the end portion 179 of the data line 171.

In the exposure process by which the photosensitive film pattern is provided, one photomask including a halftone area may be used, for example.

Figure 15A:
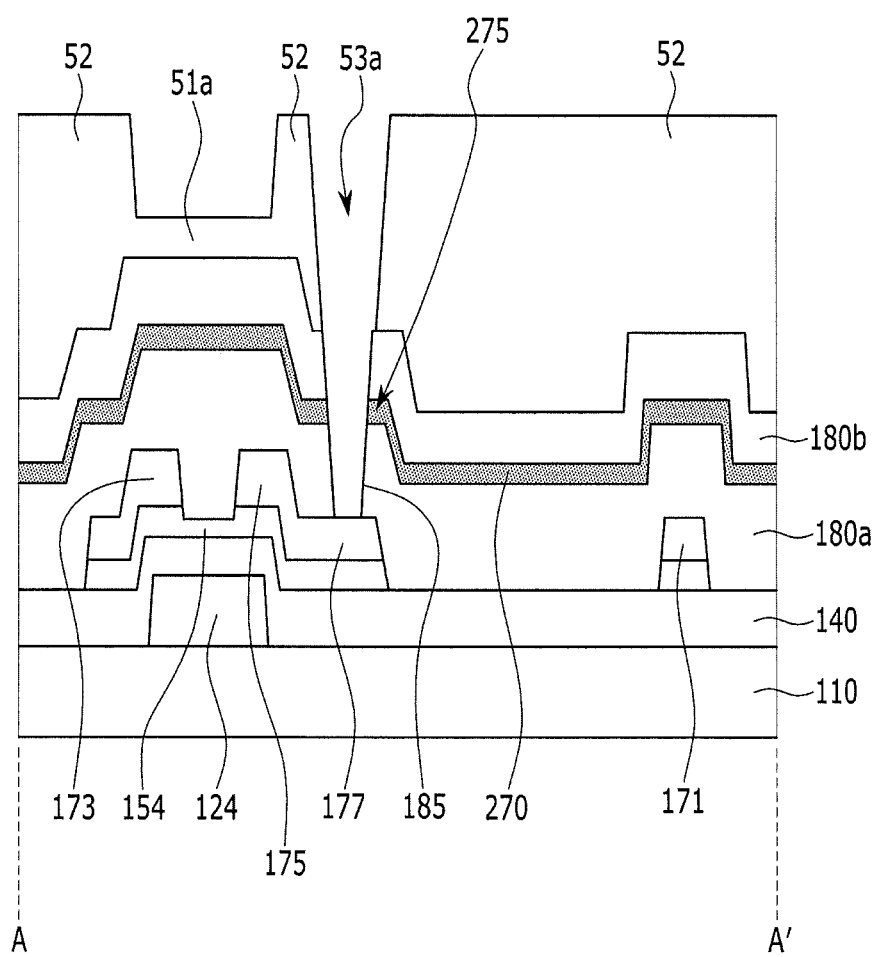
Figure 15B:
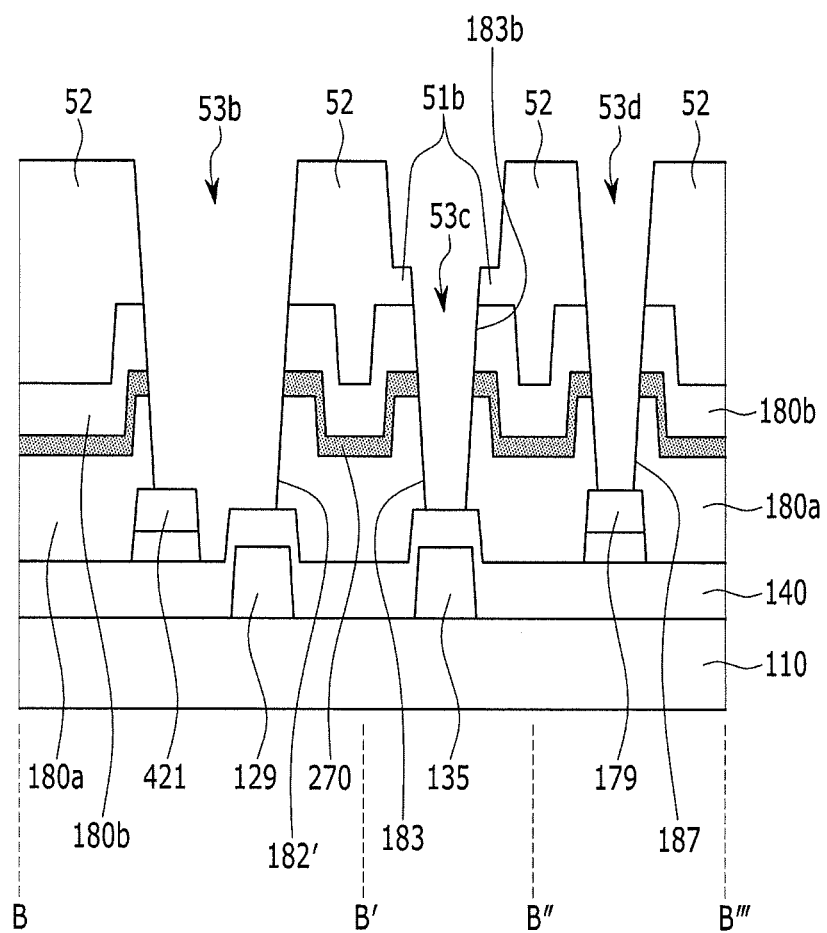

Next, referring to FIGS. 15A and 15B, the second insulating layer 180b, the common electrode 270, and the first insulating layer 180a exposed by the openings 53a, 53b, 53c, and 53d of the photosensitive film pattern are etched together by using the photosensitive film pattern as an etching mask. In this case, a dry etch method may be used, for example.

As such, a contact hole 185 exposing the extension 177 of the drain electrode 175, an opening 182' exposing the output electrode 421 and overlapping with the end portion 129 of the gate line 121, an opening 183 corresponding to the end portion of the connection bridge 135 of the common voltage line 131, and a contact hole 187 exposing the end portion 179 of the data line 171 are defined. In this case, the common electrode 270 is etched together with the second insulating layer 180b and the first insulating layer 180a to define openings corresponding to the openings 182' and 183 and the contact holes 185 and 187.

Figure 16A:
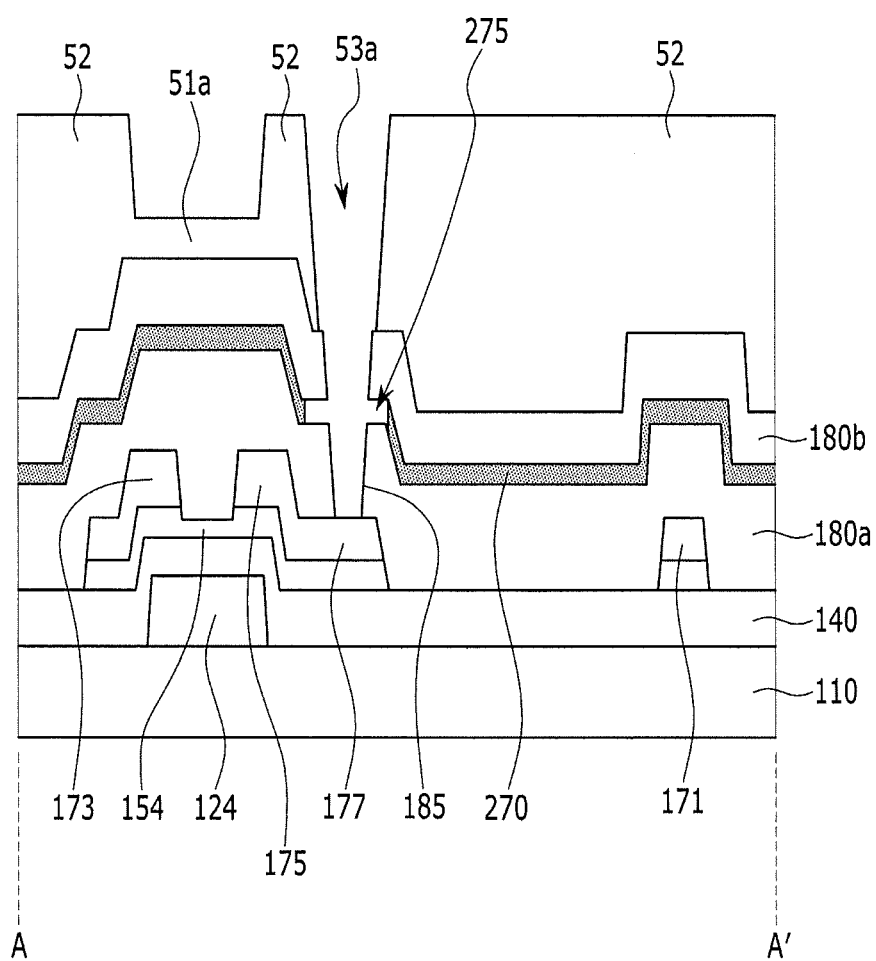
Figure 16B:
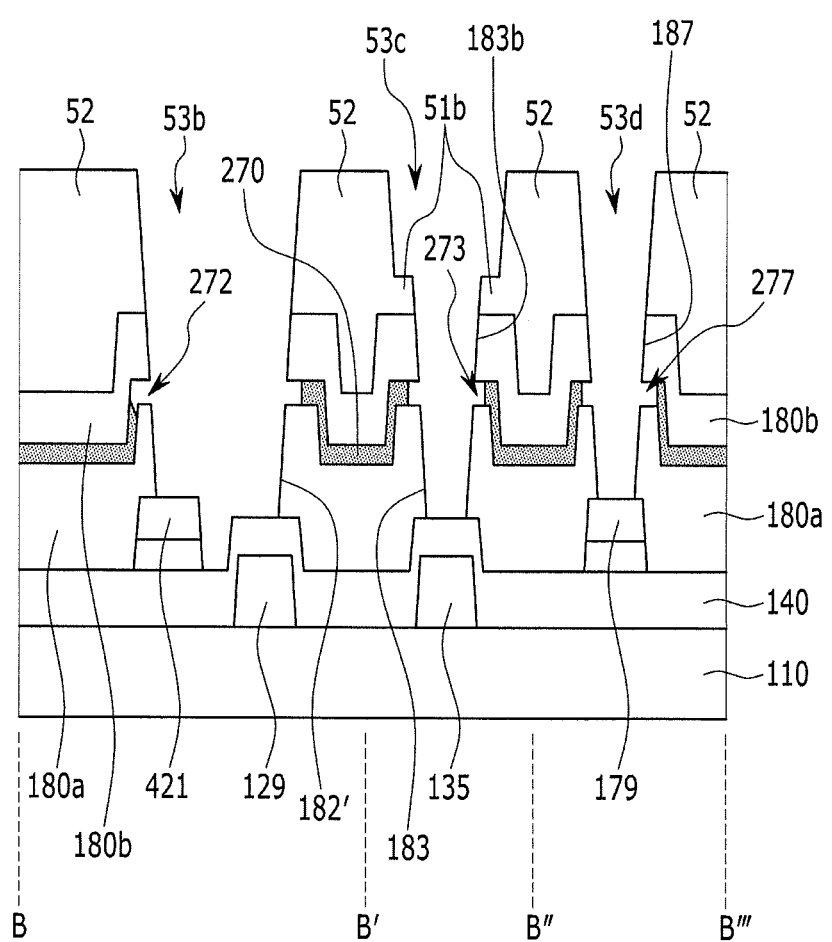

Next, referring to FIGS. 16A and 16B, an opening 275 corresponding to the extension 177 of the drain electrode 175, an opening 272 corresponding to the end portion 129 of the gate line 121 and the output electrode 421, an opening 273 corresponding to the end portion of the connection bridge 135 of the common voltage line 131, and an opening 277 corresponding to the end portion 179 of the data line 171 are defined by etching the common electrode 270 exposed from the openings 182' and 183 and sides of the contact holes 185 and 187. In this case, a wet etch method may be used, for example.

Particularly, the common electrode 270 is over-etched so that widths of the openings 275, 272, 273, and 277 of the common electrode 270 are greater than those of the contact hole 185, the opening 182', the opening 183 and the contact hole 187 corresponding thereto, respectively. As a result, edge sides of the openings 275, 272, 273, and 277 may be spaced apart from edge sides of the contact hole 185, the opening 182', the opening 183 and the contact hole 187 corresponding thereto, respectively.

A separation distance between the edge sides of the openings 275, 272, 273, and 277 and the edge sides of the contact hole 185, the opening 182', the opening 183 and the contact hole 187 corresponding thereto, respectively, may be approximately 1.0 μm or more, but is not limited thereto. In another exemplary embodiment, the separation distance between the edge sides of the openings 275, 272, 273, and 277 and the edge sides of the contact hole 185, the opening 182,' the opening 183 and the contact hole 187 corresponding thereto, respectively, may be sufficiently set so that the separation state may be maintained even after the etching process in a subsequent process, that is, the common electrode 270 may maintain an under-cut state with respect to the opening or the contact hole of the second insulating layer 180b.

Figure 17A:
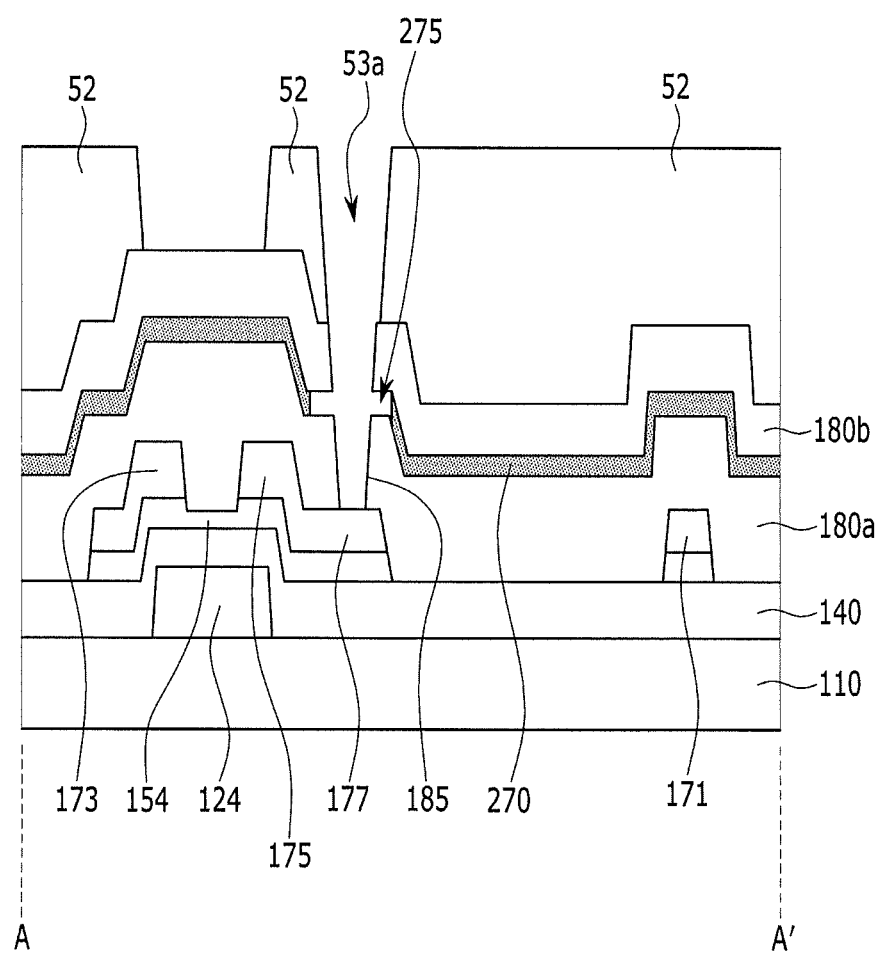
Figure 17B:
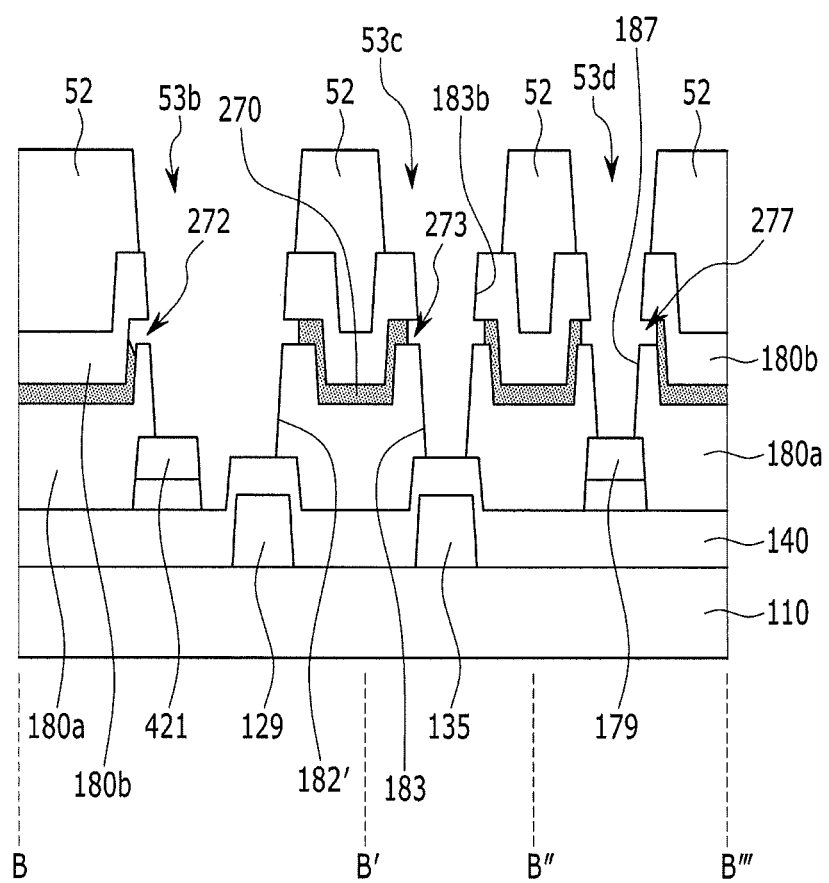

Next, referring to FIGS. 17A and 17B, the photosensitive film pattern is entirely etched by using a method such as ashing to remove the thin portions 51a and 51b. Then, the second insulating layer 180b corresponding to the channel region of the TFT SW is exposed, and the second insulating layer 180b around the opening 183 of the second insulating layer 180b is exposed. In this case, the opening 53c of the photosensitive film pattern may expose at least a part of the common electrode 270 around the opening 273 (refer to FIG. 18B).

Figure 18A:
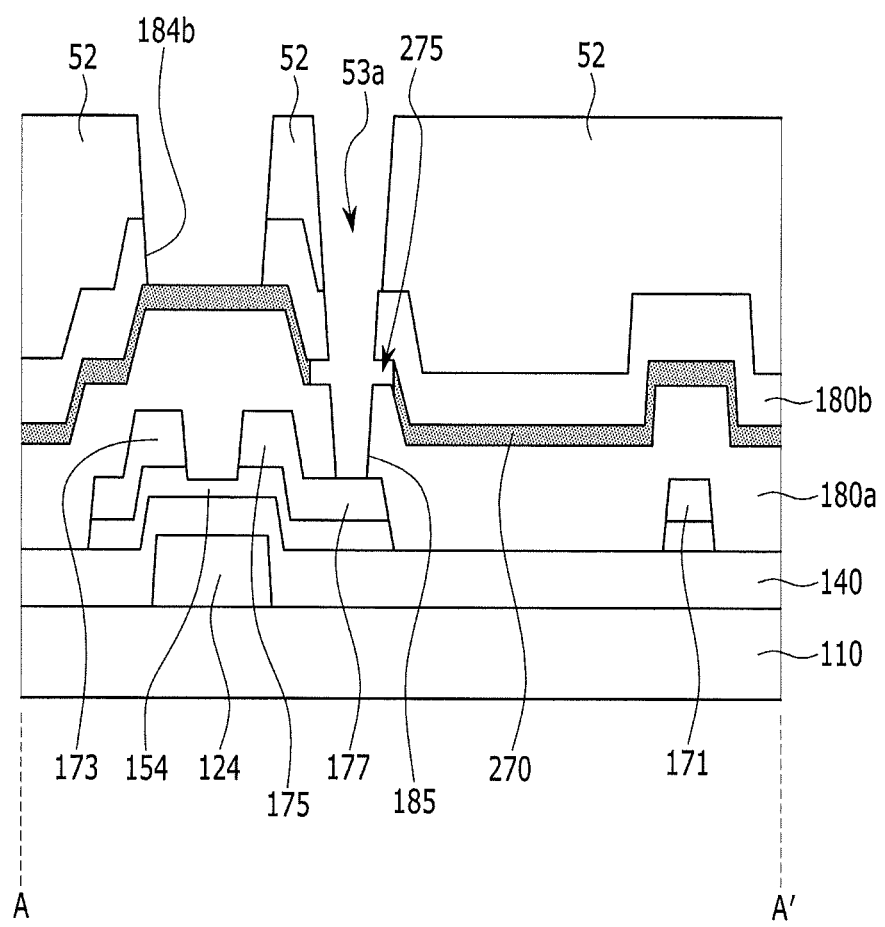
Figure 18B:
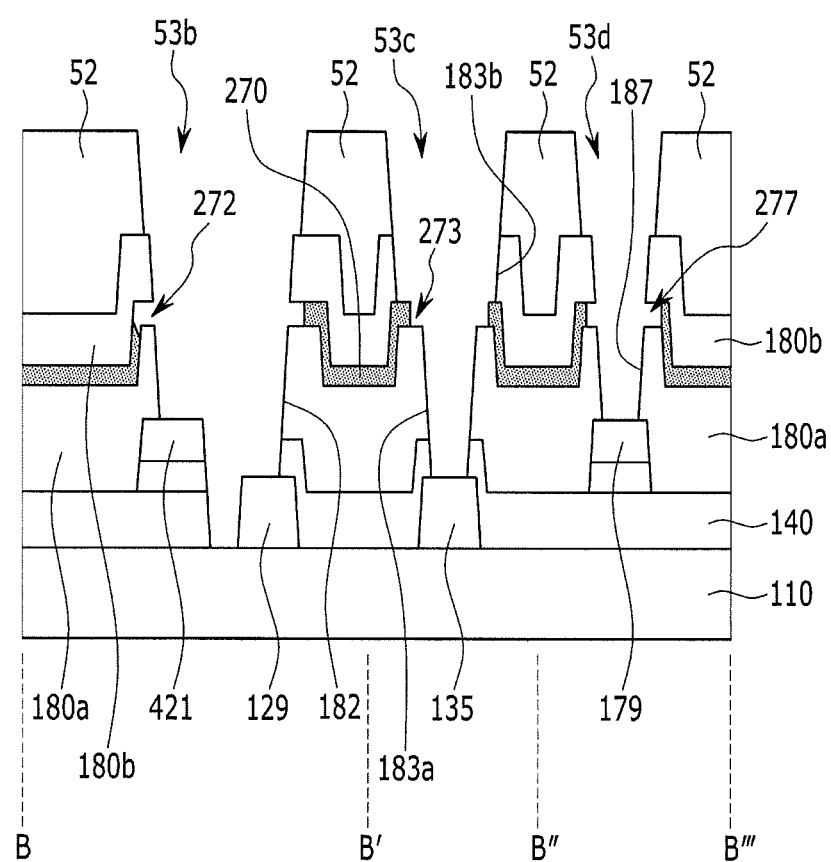

Next, referring to FIGS. 18A and 18B, the second insulating layer 180b, the first insulating layer 180a, and the gate insulating layer 140 which are exposed by using the photosensitive film pattern as the etching mask are etched by a method such as dry etching to define an opening 184b of the second insulating layer 180b corresponding to the channel region of the TFT SW, a contact hole 185 exposing the extension 177 of the drain electrode 175, a contact hole 182 exposing the end portion 129 of the gate line 121 and the output electrode 421, an opening 183b of the second insulating layer 180b exposing the common electrode 270 around the opening 273 of the common electrode 270, an contact hole 183a exposing the end portion of the connection bridge 135 of the common voltage line 131, and a contact hole 187 exposing the end portion 179 of the data line 171.

Figure 19A:
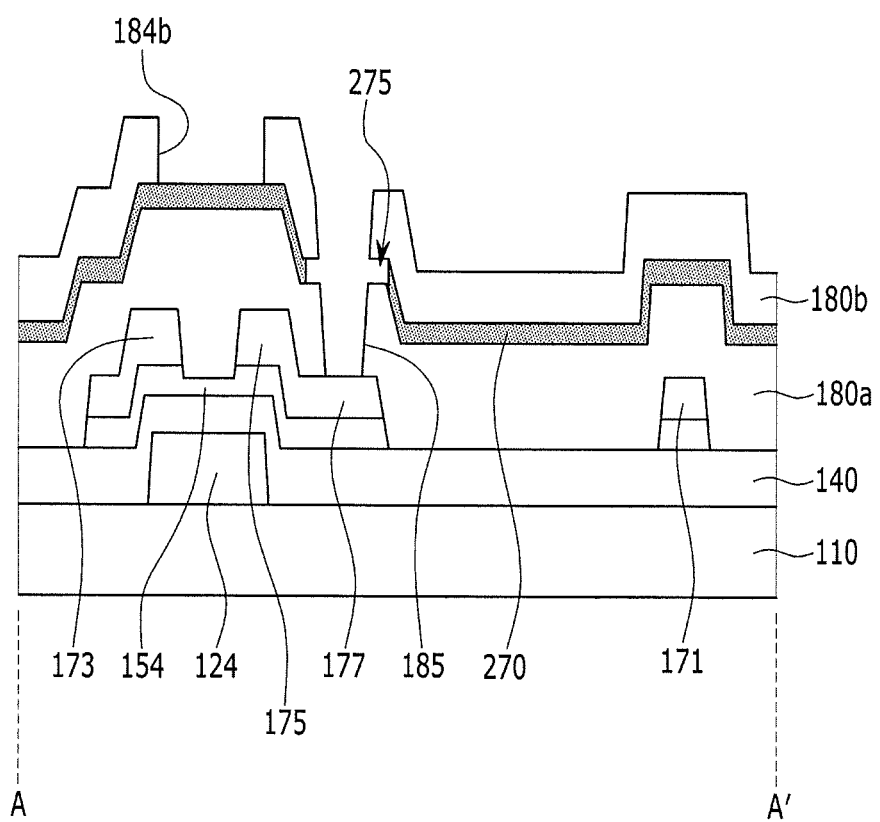
Figure 19B:
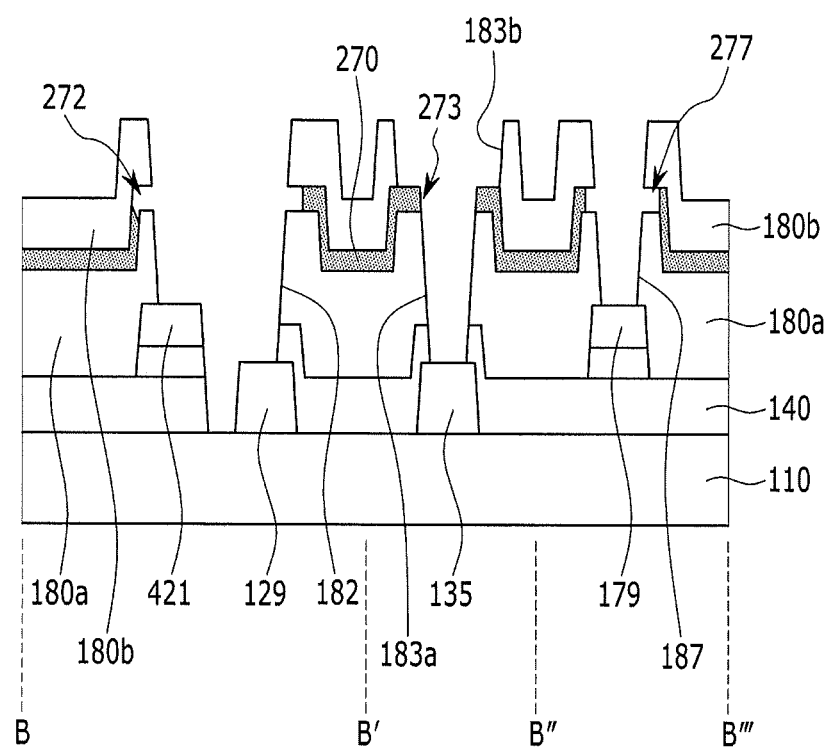

Next, referring to FIGS. 19A and 19B, the photosensitive film pattern is removed.

As such, the contact holes 182, 185 and 187 defined in the first and second insulating layer 180a and 180b, the contact hole 183a defined in the first insulating layer 180a and the gate insulating layer 140, the openings 183b and 184b which are defined in the second insulating layer 180b, and the openings 272, 273, 274, 275, and 277 defined in the common electrode 270 according to the exemplary embodiment of the invention may be defined by the photolithography process using one photomask including a halftone area, for example.

Figure 20A:
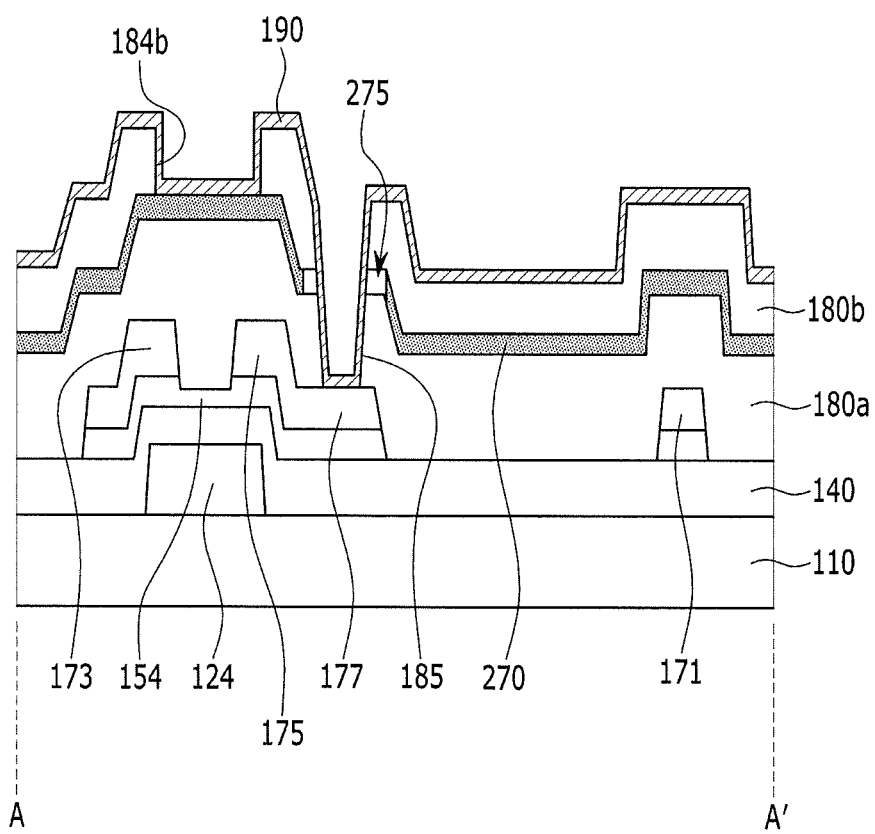
Figure 20B:
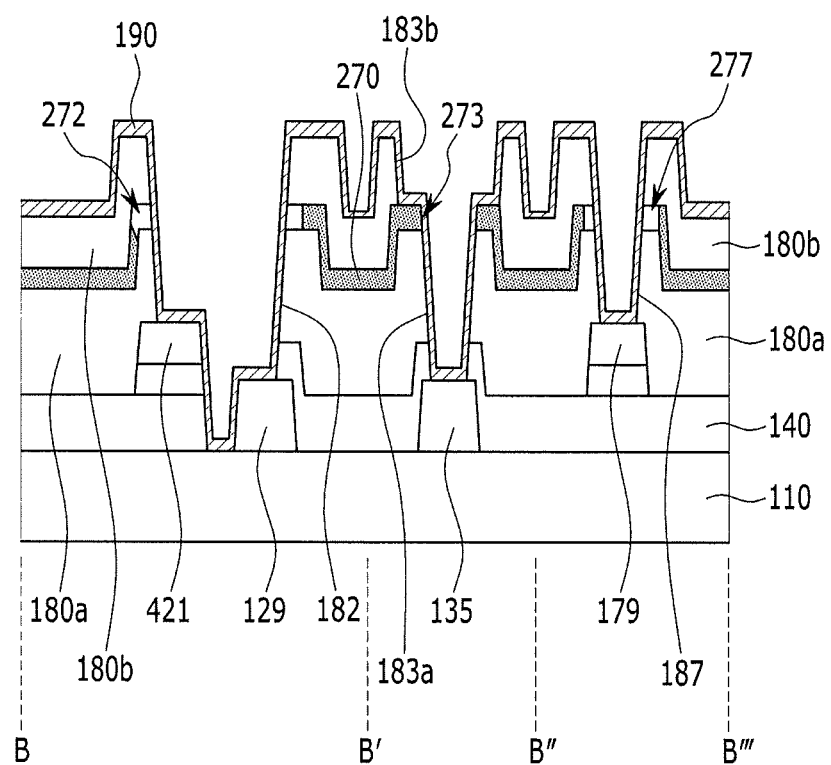

Next, referring to FIGS. 20A and 20B, a pixel electrode layer 190 is provided by disposing a transparent conductive material such as ITO or IZO and a conductive material such as a metal on the second insulating layer 180b. The pixel electrode layer 190 may contact the common electrode 270 in the opening 184b of the second insulating layer 180b, contact the extension 177 of the drain electrode 175 in the contact hole 185, contact the end portion 129 of the gate line 121 and the output electrode 421 in the contact hole 182, contact the connection bridge 135 of the common voltage line 131 in the contact hole 183a, and contact the end portion 179 of the data line 171 in the contact hole 187.

Next, referring to FIGS. 2A and 2B described above, a plurality of pixel electrodes 191 including a plurality of branch electrodes 192 and protrusions 195 and a plurality of contact assistants 82, 83, and 87 are provided by patterning the pixel electrode layer 190. In this case, a wet etch method may be used, for example. The portion of the common electrode 270 contacting the pixel electrode layer 190 in the opening 184b of the second insulating layer 180b is etched and removed together with the pixel electrode layer 190 during the patterning of the pixel electrode layer 190. As a result, the opening 274 of the common electrode 270 positioned on the channel region of the TFT SW is defined.

When the pixel electrode layer 190 is patterned, a photolithography process using one photomask may be used.

As such, according to the manufacturing method of the display device according to the exemplary embodiment of the invention, the contact holes 182, 185 and 187 defined in the first and second insulating layer 180a and 180b, the contact hole 183a defined in the first insulating layer 180a and the gate insulating layer 140, the openings 183b and 184b which are included in the second insulating layer 180b, and the openings 272, 273, 274, 275, and 277 defined in the common electrode 270 may be defined by using one photomask. Accordingly, the display device may be manufactured by using a minimum photomask, and a manufacturing process may be simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a first signal electrode configured to transfer a signal;
a first insulating layer positioned on the first signal electrode;
a first electrode positioned on the first insulating layer;
a second insulating layer positioned on the first electrode; and
a second electrode positioned on the second insulating layer,
wherein
a first contact hole exposing the first signal electrode is defined in the first insulating layer and the second insulating layer,
the second electrode is connected with the first signal electrode through the first contact hole, and
an opening including an edge side surrounding the first contact hole in a plan view is defined in the first electrode.

2. The display device of claim 1, further comprising:
a second signal electrode positioned below the first insulating layer,
wherein
a second contact hole exposing the second signal electrode is defined in the first insulating layer, and
a first open portion substantially aligned with the second contact hole is defined in the first electrode.

3. The display device of claim 2, further comprising:
a first contact assistant connected with the second signal electrode through the second contact hole and contacting an upper surface of the first electrode around the first open portion.

4. The display device of claim 3, wherein:
a second open portion is defined in the second insulating layer and surrounds the first open portion in the plan view.

5. The display device of claim 4, wherein:
an edge side of the second open portion is substantially aligned with an edge side of the first contact assistant.

6. The display device of claim 2, further comprising:
a third signal electrode positioned below the first insulating layer and separated from the first signal electrode, wherein
the first contact hole exposes the third signal electrode, and
the second electrode contacts the first signal electrode and the third signal electrode through the first contact hole.

7. The display device of claim 2, further comprising:
a semiconductor positioned below the first insulating layer and connected with the first signal electrode,
wherein a third open portion corresponding to a channel region of the semiconductor is defined in the first electrode.

8. The display device of claim 7, wherein:
a fourth open portion substantially aligned with the third open portion is defined in the second insulating layer.

9. The display device of claim 1, further comprising:
a third signal electrode positioned below the first insulating layer and separated from the first signal electrode, wherein
the first contact hole exposes the third signal electrode, and
the second electrode contacts the first signal electrode and the third signal electrode through the first contact hole.

10. The display device of claim 1, further comprising:
a semiconductor positioned below the first insulating layer and connected with the first signal electrode,
wherein a third open portion corresponding to a channel region of the semiconductor is defined in the first electrode.

11. The display device of claim 1, wherein:
the second electrode includes a plurality of branch electrodes overlapping with the first electrode.

12. A manufacturing method of a display device, comprising:
disposing a first signal electrode on a substrate;
disposing a first insulating layer, a first electrode, and a second insulating layer positioned on the first signal electrode in sequence;
disposing a first photosensitive film pattern on the second insulating layer;
defining a plurality of first open portions exposing the first electrode by etching the second insulating layer which is exposed by the first photosensitive film pattern; and
defining a plurality of second open portions respectively corresponding to the plurality of first open portions by etching the exposed first electrode,
wherein a width of a second open portion of the plurality of second open portions taken along a horizontal direction of a cross section is larger than that of a corresponding first open portion of the plurality of first open portions.

13. The manufacturing method of claim 12, wherein:
the first photosensitive film pattern includes a first portion, and a second portion having a smaller thickness than the first portion,
the method further comprises providing a second photosensitive film pattern by removing the second portion of the first photosensitive film pattern after the defining the plurality of second open portions.

14. The manufacturing method of claim 13, further comprising:
providing the first signal electrode and a part of the first electrode by etching the second insulating layer and the first insulating layer which are exposed by the second photosensitive film pattern after the providing the second photosensitive film pattern.

15. The manufacturing method of claim 14, after the exposing of the first signal electrode and the part of the first electrode by etching the second insulating layer and the first insulating layer which are exposed by the second photosensitive film pattern, the method further comprising:
disposing a second electrode layer on the second insulating layer; and
providing a second electrode by patterning the second electrode layer.

16. The manufacturing method of claim 15, further comprising:
disposing a second signal electrode positioned below the first insulating layer,
wherein in the etching of the second insulating layer and the first insulating layer which are exposed by the second photosensitive film pattern, a second contact hole exposing the second signal electrode and substantially aligned with a corresponding second open portion of the plurality of second open portions is defined in the first insulating layer.

17. The manufacturing method of claim 16, wherein:
in the providing the second electrode, a first contact assistant connected with the second signal electrode through the second contact hole and contacting an upper surface of the first electrode around the second contact hole is provided.

18. The manufacturing method of claim 15, further comprising:
providing a semiconductor positioned below the first insulating layer and connected with the first signal electrode,
wherein in the patterning of the second electrode layer, a part of the exposed first electrode is removed together with the second electrode layer to define a third open portion corresponding to a channel region of the semiconductor.

19. The manufacturing method of claim 12, wherein:
in the defining the plurality of first open portions, the first electrode and the first insulating layer are etched together to expose the first signal electrode.

20. The manufacturing method of claim 19, wherein:
in the defining the plurality of first open portions, a side surface of the first electrode is exposed.

* * * * *